(12) United States Patent
Oikawa

(10) Patent No.: US 7,531,249 B2
(45) Date of Patent: May 12, 2009

(54) MAGNETIC RECORDING MEDIUM AND METHOD OF PRODUCING THE SAME

(75) Inventor: Katsuya Oikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/680,838

(22) Filed: Mar. 1, 2007

(65) Prior Publication Data

US 2007/0217072 A1    Sep. 20, 2007

(30) Foreign Application Priority Data

Mar. 14, 2006   (JP)   ............................. 2006-070000

(51) Int. Cl.
   *G11B 5/66* (2006.01)
(52) U.S. Cl. ..................... 428/829; 428/830
(58) Field of Classification Search ................. 428/846, 428/827, 829, 403
   See application file for complete search history.

(56) References Cited

U.S. PATENT DOCUMENTS

| | | | |
|---|---|---|---|
| 6,858,319 B2* | 2/2005 | Yasui et al. .................. 428/611 |
| 7,081,303 B2* | 7/2006 | Yasui et al. .................. 428/446 |
| 7,105,239 B2* | 9/2006 | Oikawa et al. ............. 428/828.1 |
| 7,183,012 B2* | 2/2007 | Saito et al. ............... 428/831.2 |
| 2002/0045070 A1* | 4/2002 | Sakakima et al. ...... 428/694 TS |
| 2002/0086185 A1* | 7/2002 | Yasui et al. ............. 428/694 TS |
| 2004/0033339 A1 | 2/2004 | Fukutani et al. ............. 428/137 |
| 2004/0043208 A1 | 3/2004 | Fukutani et al. .......... 428/304.4 |
| 2004/0048092 A1 | 3/2004 | Yasui et al. .................. 428/642 |
| 2006/0086691 A1 | 4/2006 | Fukutani et al. ............... 216/56 |
| 2006/0192309 A1 | 8/2006 | Fukutani et al. ............. 264/1.21 |

FOREIGN PATENT DOCUMENTS

JP   2004-237429   8/2004

OTHER PUBLICATIONS

Inaba, et al., Preliminary Study of Hard/Soft—Stacked Perpendicular Recording Media, J. Magnetics, Soc. Jpn, vol. 29, No. 3, 239-242, 2005.

* cited by examiner

*Primary Examiner*—D. Lawrence Tarazano
*Assistant Examiner*—Gary D Harris
(74) *Attorney, Agent, or Firm*—Fitzpatrick, Cella, Harper & Scinto

(57) ABSTRACT

Provided is a magnetic recording medium having less noise and less recording degradation ascribed to "thermal fluctuation". The magnetic recording medium has a magnetic recording film in which a magnetic region is dispersed in a non-magnetic region. In the magnetic recording medium, the magnetic region includes a hard magnetic layer which is a first magnetic portion made of a hard magnetic material with a coercive force and a soft magnetic layer which is a second magnetic portion made of a soft magnetic material with a coercive force smaller than that of the first magnetic portion, and the hard magnetic layer and the soft magnetic layer are laminated in a direction parallel to a film surface of the magnetic recording film.

16 Claims, 8 Drawing Sheets

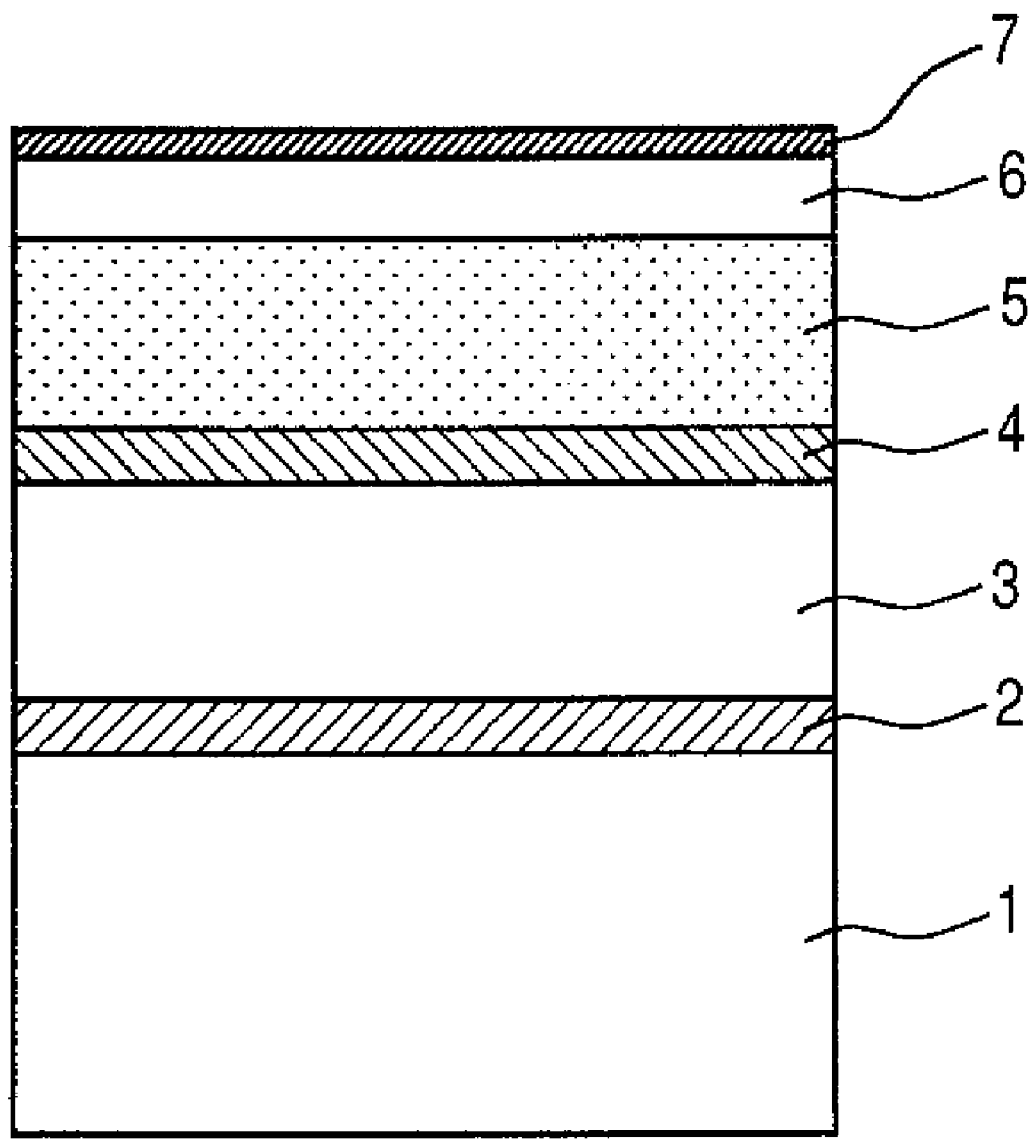

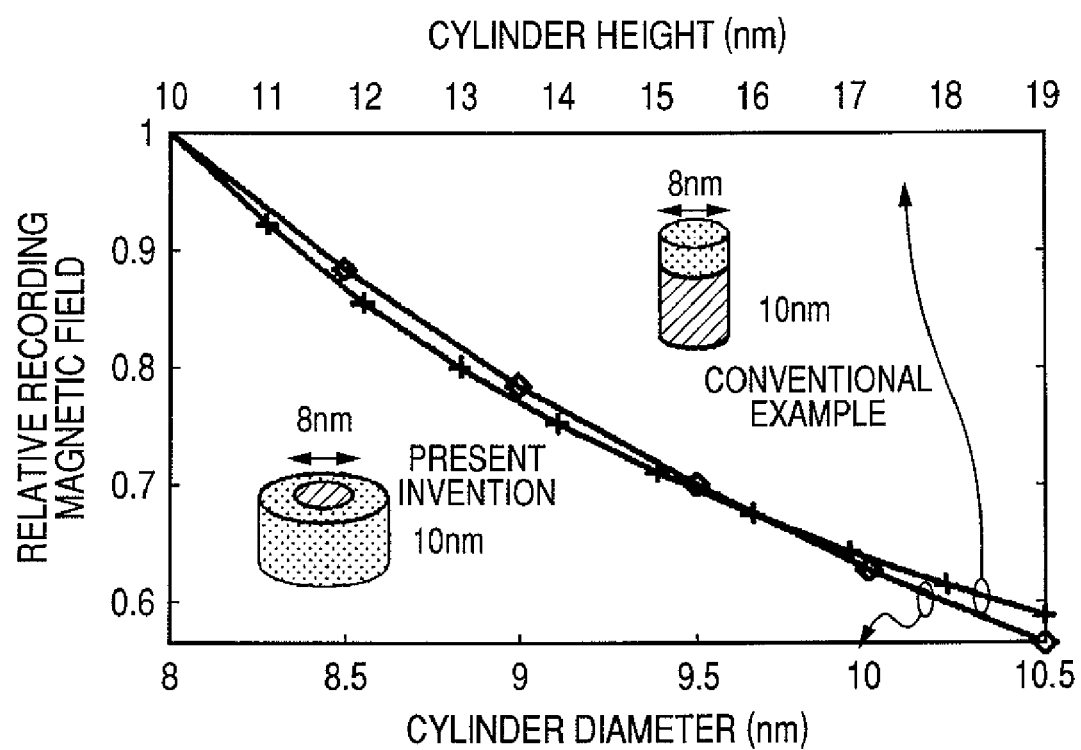

MAGNETIC RECORDING MEDIUM AND METHOD OF PRODUCING THE SAME

BACKGROUND OF THE INVENTION

1. Field of the Invention

The present invention relates to a magnetic recording medium capable of performing high-density magnetic recording, and to a method of producing the same.

2. Description of the Related Art

Recently, a perpendicular magnetic recording medium is drawing attention as a recording medium. Further, an enhancement of plane recording density of a magnetic recording medium such as a hard disk drive (hereinafter, referred to as "HDD") is expected along with an increase in an information amount, and each recording bit size on the magnetic recording medium is becoming very small (i.e., about several 10 nm).

However, the reduction in a recording bit causes problems in that a magnetization amount per bit decreases and magnetization information disappears due to a magnetization inversion ascribed to "thermal fluctuation".

In general, the "thermal fluctuation" has a larger effect as a value of Ku·V/kT (herein, Ku: anisotropy constant, V: magnetization minimum unit volume, k: Boltzmann constant, and T: absolute temperature) decreases. It is considered experimentally that when Ku·V/kT becomes less than 100, the inversion of magnetization ascribed to the "thermal fluctuation" occurs.

As a magnetic recording medium for reducing recording sensitivity while keeping durability with respect to "thermal fluctuation", "Official Journal of The Magnetics Society of Japan" vol. 29, 2005, pages 239-242 by The Magnetics Society of Japan proposes a perpendicular magnetic recording medium in which hard magnetism and soft magnetism are formed in a film thickness direction. FIG. 4 is a view schematically illustrating a magnetic recording film described in "Official Journal of The Magnetics Society of Japan" vol. 29, 2005, pages 239-242 by The Magnetics Society of Japan. The magnetic recording film has a configuration in which a hard magnetic layer 402 made of CoCrPt—SiO$_2$ is formed on a seed layer 401 to be a seed of crystal growth, and a soft magnetic layer 403 made of NiFe—SiO$_2$ is formed after that. This technique is characterized by using a configuration in which a hard layer and a soft layer are laminated so as to keep a magnetic field for recording low while securing thermal stability involved in a reduction of a magnetic region. Here, the magnetic recording film includes a seed layer 401, crystal particles 404, CoCrPt crystals 405, and NiFe crystals 406.

However, with the configuration in which the layers are laminated in the film thickness direction, there is a fear that a film thickness increases. The increase in the film thickness causes a recording magnetic field on a lower portion side (opposite side of a recording head) of a recording film to be diffused easily in a film surface direction, so it is not desirable in a case of enhancing recording density.

On the other hand, the configuration utilizing the hard magnetism and the soft magnetism will become important in the future along with the increase in the recording density.

Thus, the inventors of the present invention have made intensive studies for a new magnetic recording medium having hard magnetism and soft magnetism in an in-plane direction (film surface direction) of a magnetic recording film of a magnetic recording medium, thereby achieving the present invention.

SUMMARY OF THE INVENTION

An object of the present invention is to provide a magnetic recording medium with the above-mentioned configuration, with less noise and less recording degradation ascribed to "thermal fluctuation", and a method of producing the same.

To achieve the above-mentioned object, according to an aspect of the present invention, there is provided a magnetic recording medium, including a magnetic recording film in which a magnetic region is dispersed in a non-magnetic region, in which: the magnetic region includes a first magnetic portion with a coercive force and a second magnetic portion with a coercive force smaller than that of the first magnetic portion; and the first magnetic portion and the second magnetic portion are laminated in a direction parallel to a film surface of the magnetic recording film.

According to the aspect of the present invention, in the magnetic recording medium, the first magnetic portion can be made of a hard magnetic material; and the second magnetic portion can be made of a soft magnetic material.

According to the aspect of the present invention, in the magnetic recording medium, the magnetic region can be provided such that the second magnetic portion covers a periphery of the first magnetic portion.

According to the aspect of the present invention, in the magnetic recording medium, the magnetic region can be provided such that the first magnetic portion covers a periphery of the second magnetic portion.

According to the aspect of the present invention, in the magnetic recording medium, an average magnetic anisotropic energy density of the second magnetic portion made of the soft magnetic material is desirably half or less as an average magnetic anisotropic energy density of the first magnetic portion made of the hard magnetic material.

According to the aspect of the present invention, in the magnetic recording medium, a ratio k=Ku2/Ku1 of an average magnetic anisotropic energy density Ku2 of the second magnetic portion made of the soft magnetic material to an average magnetic anisotropic energy density Ku1 of the first magnetic portion made of the hard magnetic material can be smaller than a ratio μ=Ms2/Ms1 of an average saturation magnetization Ms2 of the second magnetic portion to an average saturation magnetization Ms1 of the first magnetic portion.

According to the aspect of the present invention, in the magnetic recording medium: the magnetic region can be provided such that the second magnetic portion made of a soft magnetic material covers the periphery of the first magnetic portion made of a hard magnetic material; a radius of a cross-section in a direction parallel to a film surface of a film of the first magnetic portion made of the hard magnetic material can be equal to or less than a critical radius Rh represented by the following formula (1):

$$Rh \frac{36\sqrt{AhKh}}{4\pi Msh^2} \tag{1}$$

where, in the first magnetic portion made of the hard magnetic material, Rh represents a critical radius (cm), Ah represents an exchange stiffness constant (erg/cm), Kh represents a magnetic anisotropy constant (erg/cc), and Msh represents saturation magnetization (emu/cc); and a thickness of a cross-section in a direction parallel to a film surface of a film of the second magnetic portion made of the soft magnetic material can be twice or less of a critical radius Rs represented by the following formula (2):

$$Rs = \frac{C\sqrt{As}}{Mss} \quad (2)$$

where, in the second magnetic portion made of the soft magnetic material, Rs represents a critical radius (cm), C represents a coefficient depending upon a shape, which is 1.44, As represents an exchange stiffness constant (erg/cm), and Mss represents saturation magnetization (emu/cc).

According to the aspect of the present invention, in the magnetic recording medium: the magnetic region can be provided such that the first magnetic portion made of a hard magnetic material covers the periphery of the second magnetic portion made of a soft magnetic material; a radius of a cross-section in a direction parallel to a film surface of a film of the second magnetic portion made of the soft magnetic material can be equal to or less than a critical radius Rs represented by the following formula (2):

$$Rs = \frac{C\sqrt{As}}{Mss} \quad (2)$$

where, in the second magnetic portion made of the soft magnetic material, Rs represents a critical radius (cm), C represents a coefficient depending upon a shape, which is 1.44, As represents an exchange stiffness constant (erg/cm), and Mss represents saturation magnetization (emu/cc); and a thickness of a cross-section in a direction parallel to a film surface of a film of the first magnetic portion made of the hard magnetic material can be twice or less of a critical radius Rh represented by the following formula (1):

$$Rh \frac{36\sqrt{AhKh}}{4\pi Msh^2} \quad (1)$$

where, in the first magnetic portion made of the hard magnetic material, Rh represents a critical radius (cm), Ah represents an exchange stiffness constant (erg/cm), Kh represents a magnetic anisotropy constant (erg/cc), and Msh represents saturation magnetization (emu/cc).

According to the aspect of the present invention, in the magnetic recording medium, the first magnetic portion made of a hard magnetic material can have a magnetic anisotropy easy axis in a direction perpendicular to the film surface of the magnetic recording medium.

According to the aspect of the present invention, in the magnetic recording medium, a difference between an average magnetic anisotropic energy density and an average saturation magnetization is desirably caused by a difference in constituent elements constituting the first magnetic portion and the second magnetic portion.

According to the aspect of the present invention, in the magnetic recording medium, a difference between an average magnetic anisotropic energy density and an average saturation magnetization is desirably caused by a difference of at least one of a composition ratio and a crystal structure of constituent elements constituting the first magnetic portion and the second magnetic portion.

According to the aspect of the present invention, in the magnetic recording medium, a difference between an average magnetic anisotropic energy density and an average saturation magnetization is desirably caused by a combination of a difference in constituent elements constituting the first magnetic portion and the second magnetic portion and a difference in at least one of a composition ratio and a crystal structure of the constituent elements.

According to the aspect of the present invention, in the magnetic recording medium, the first magnetic portion made of a hard magnetic material can contain any of FePt, FePd, CoPt, and CoPd having an L10 regularized structure.

According to the aspect of the present invention, in the magnetic recording medium, the second magnetic portion made of a soft magnetic material can contain any of Fe, Ni, and Co.

To achieve the above-mentioned object, according to another aspect of the present invention, there is provided a method of producing a magnetic recording medium, including the steps of: filling a plurality of holes of a porous base material with a hard magnetic material to form a first magnetic portion; removing one of a part and an entirety of the porous base material to expose the first magnetic portion; covering the exposed first magnetic portion with a soft magnetic material to form a second magnetic portion; and filling a periphery of the second magnetic portion with a non-magnetic material to bury the first magnetic portion and the second magnetic portion in the non-magnetic material.

Further, according to the another aspect of the present invention, the method of producing a magnetic recording medium can further include the steps of: filling the plurality of holes of the porous base material with first metal made of at least one of Pt and Pd; removing one of the part and the entirety of the porous base material to expose the first metal; covering the exposed first metal with second metal containing at least one of Fe and Co; subjecting the first metal and the second metal to heat-treatment to form the first magnetic portion made of the hard magnetic material containing any of FePt, FePd, CoPt, and CoPd having an L10 regularized structure, and the second magnetic portion made of the soft magnetic material containing any of Fe and Co, which covers the first magnetic portion; and filling the periphery of the second magnetic portion with the non-magnetic material to bury the first magnetic portion and the second magnetic portion in the non-magnetic material.

To achieve the above-mentioned object, according to still another aspect of the present invention, there is provided a method of producing a magnetic recording medium, including the steps of: filling a plurality of holes of a porous base material with a soft magnetic material to form a second magnetic portion; removing one of a part and an entirety of the porous base material to expose the second magnetic portion; covering the exposed second magnetic portion with a hard magnetic material to form a first magnetic portion; and filling a periphery of the first magnetic portion with a non-magnetic material to bury the first magnetic portion and the second magnetic portion in the non-magnetic material.

Further, according to the still another aspect of the present invention, the method of producing a magnetic recording medium can further include the steps of: filling the plurality of holes of the porous base material with second metal made of at least one of Fe and Co; removing one of the part and the entirety of the porous base material to expose the second metal; covering the exposed second metal with first metal containing at least one of Pt and Pd; subjecting the first metal and the second metal to heat-treatment to form the second magnetic portion made of the soft magnetic material containing any of Fe and Co, and the first magnetic portion made of the hard magnetic material containing any of FePt, FePd, CoPt, and CoPd having an L10 regularized structure, which covers the second magnetic portion; and filling the periphery of the first magnetic portion with the non-magnetic material to bury the first magnetic portion and the second magnetic portion in the non-magnetic material.

According to the present invention, a magnetic recording medium with less noise and less recording degradation ascribed to "thermal fluctuation" can be provided without increasing the film thickness of the magnetic recording medium. In particular, the recording sensitivity of a magnetic recording film using a high magnetic anisotropic magnetic material can be enhanced without increasing the film thickness of the magnetic recording film. Therefore, a magnetic field can be efficiently applied to the magnetic recording film even with a conventional magnetic head, so a magnetic recording medium with further enhanced recording sensitivity and less noise during recording can be provided.

Further features of the present invention will become apparent from the following description of embodiments with reference to the attached drawings.

BRIEF DESCRIPTION OF THE DRAWINGS

FIG. 1 is a structural view of a cross-section illustrating an embodiment of a magnetic recording medium according to the present invention.

FIG. 10 is a graph illustrating a difference between a specific configuration of the magnetic recording medium according to the present invention and the conventional example.

DESCRIPTION OF THE EMBODIMENTS

Figure 2A:
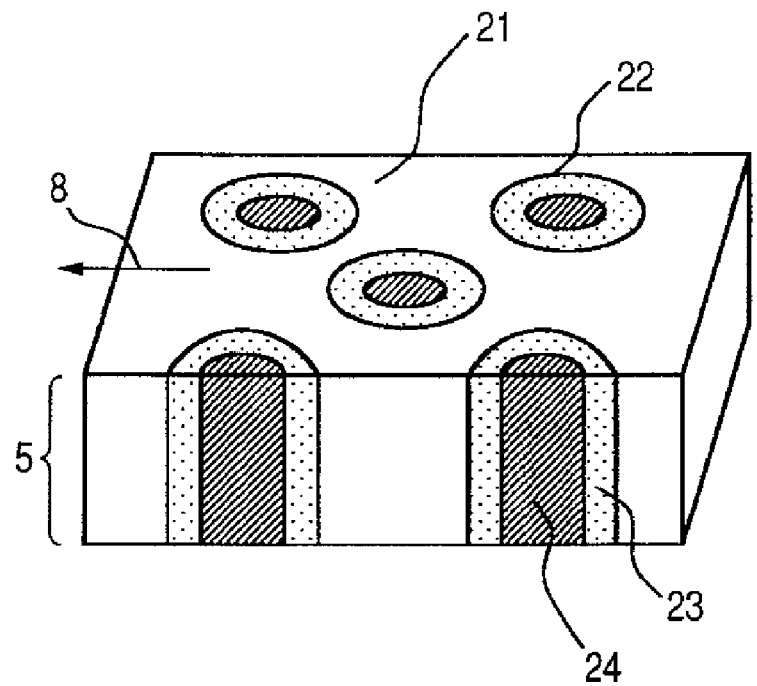
FIGS. 2A and 2B are schematic views each illustrating an embodiment of a magnetic recording film of the magnetic recording medium.

Hereinafter, the present invention will be described in detail.

A magnetic recording medium has a magnetic recording film in which a magnetic region is dispersed in a non-magnetic region. In the magnetic recording medium, the magnetic region includes a first magnetic portion made of a hard magnetic material with a coercive force and a second magnetic portion made of a soft magnetic material with a coercive force smaller than that of the first magnetic portion, and the first and second magnetic portions are laminated in a direction parallel to a film surface of the magnetic recording film.

An embodiment of the present invention will be described with reference to FIGS. 1, 2A, and 2B. FIG. 1 is a structural view of a cross-section illustrating an embodiment of a magnetic recording medium according to the present invention. In FIG. 1, the magnetic recording medium includes a substrate 1, an underlying layer 2, a soft magnetic underlying layer 3, a non-magnetic layer 4, a magnetic recording film 5, a protective layer 6, and a lubricating layer 7.

Figure 8:
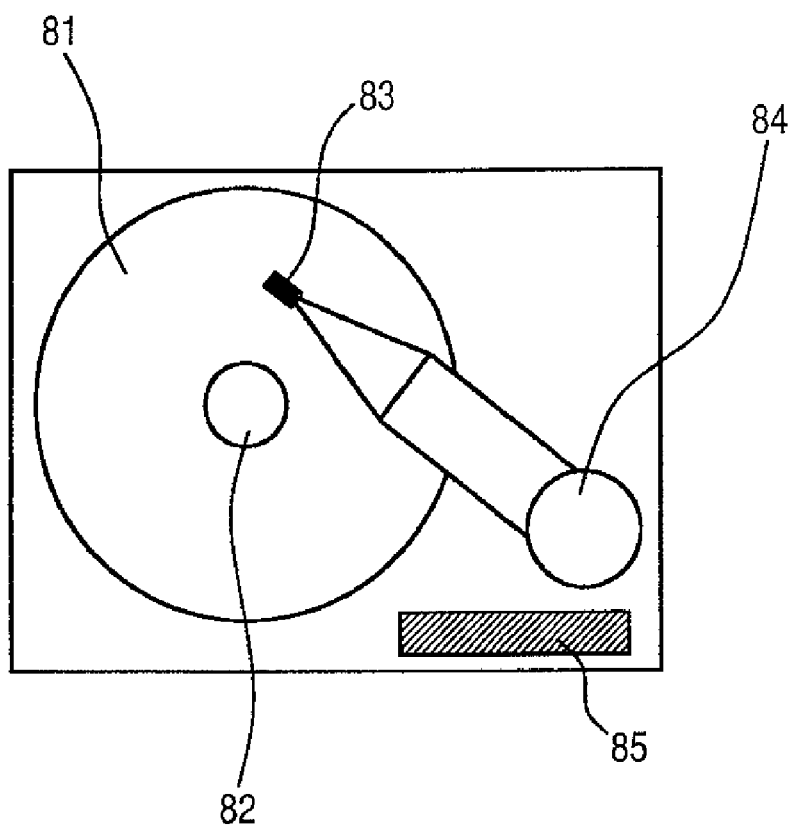
FIG. 8 is a view illustrating a configuration of a magnetic recording apparatus using the magnetic recording medium according to the present invention.

Herein, the present invention will be described regarding a configuration suitable for a disk-shaped medium of an HDD. As illustrated in FIG. 8, a disk-shaped magnetic recording medium 81 can be incorporated in an HDD apparatus including a reading/writing magnetic head 83, a magnetic head driving portion 84 for moving the magnetic head 83 to a desired recording position, a magnetic recording medium driving portion 82 for rotating the disk-shaped magnetic recording medium 81 with a motor, and a signal processing portion 85. However, the main configuration of the present invention is applicable to a magnetic recording film of a general magnetic recording medium, and can be used with respect to a medium having a perpendicular magnetic recording film on a solid substrate, so an applicable range of the present invention is not limited to a disk-shaped rotation medium.

The substrate 1 is made of glass, aluminum, carbon, plastic, or Si, and can be made of any other materials as long as they have mechanical characteristics with which satisfactory recording of a signal with respect to the magnetic recording film 5 and reproduction of a magnetic signal from the magnetic recording film 5 can be performed.

The underlying layer 2 is provided for the purposes of removing the influence of surface roughness of the substrate 1, protecting each of the upper layers from oxygen and moisture, increasing hardness of the substrate 1, and enhancing adhesion between the substrate 1 and the upper layers. Generally, the underlying layer 2 is produced by forming NiP on the substrate 1 in a thickness of several nanometers to several hundreds of nanometers by plating. Further, the underlying layer 2 may have the effect of controlling the magnetic characteristics of the soft magnetic underlying layer 3.

The soft magnetic underlying layer 3 is provided for the purpose of converging a magnetic flux to enhance magnetic field intensity in the magnetic recording film 5, and aligning a magnetic field in a direction perpendicular to a recording film surface, when information is written on the magnetic recording medium with a magnetic field generated by the recording magnetic head. In particular, a reflux of a magnetic flux is caused with a recording monopole of the recording magnetic head, the soft magnetic underlying layer 3, and a trading pole of the recording magnetic head, using a monopole recording magnetic head for perpendicular magnetic recording, thereby constituting a closed magnetic circuit. Thus, satisfactory magnetic recording can be performed. Although a material with a high magnetic permeability, e.g., an NiFe alloy (permalloy) and an amorphous soft magnetic material such as FeTaC and CoZrNb can be used for converging a magnetic flux, other materials with a high magnetic permeability may be used depending upon the compatibility in film formation with respect to the film materials of the upper layers. Further, for the purpose of preventing spike noise caused by the movement of a domain wall in the soft magnetic underlying layer 3, a multi-layered configuration may be employed, an antiferromagnetic material may be used, and alignment control may be performed. The effect of converging a magnetic flux decreases when the film thickness becomes substantially 100 nanometers or less. However, if the film thickness is too large, productivity and medium durability are degraded. Therefore, the film thickness is desirably about several hundred nanometers to several microns.

The non-magnetic layer 4 is provided for the purpose of controlling the magnetic coupling between the soft magnetic underlying layer 3 and the magnetic recording film 5, controlling the alignment during film formation of the magnetic recording film 5.

The magnetic recording film 5 records a magnetization direction in accordance with a recording information signal in a direction perpendicular to a film surface. The feature of the present invention lies in the configuration of the magnetic recording film 5, so the configuration of the magnetic recording film 5 will be described later with reference to FIGS. 2A and 2B.

The protective layer 6 is provided for the purpose of protecting the magnetic recording film 5, and is obtained by forming a film of carbon, in particular, diamond-like carbon (DLC).

The lubricating layer 7 is used in an ordinary HDD medium for the purpose of recording/reproduction with a floating magnetic head and enhancing the lubricity of the medium surface and the floating magnetic head. For example, perfluoropolyether (PFPE) can be used.

During recording, a recording magnetic field in a direction substantially perpendicular to a medium surface is applied to a magnetic recording medium with a floating magnetic recording head on the surface of the lubricating layer 7. As the magnetic recording head, a monopole head is desirable because a recording magnetic field is converged and the recording magnetic field can be applied to the magnetic recording film 5 efficiently. The floating magnetic recording head floats and moves at a flying height of ten-several nanometers above the surface of the lubricating layer 7, and generates a magnetic field in a direction substantially perpendicular to the perpendicular magnetic medium by the monopole head. The generated magnetic field passes through a space between the magnetic recording head and the surface of the lubricating layer 7, the lubricating layer 7, and the protective layer 6 to invert the magnetization of a recorded portion in the magnetic recording film 5 in a predetermined recording direction (either upward or downward direction in the direction perpendicular to the medium surface), passes trough the non-magnetic layer 4, and reach the soft magnetic underlying layer 3. The magnetic field that has become parallel to the film surface due to the high magnetic permeability of the soft magnetic underlying layer 3 traverses the non-magnetic layer 4, the magnetic recording film 5, the protective layer 6, and the lubricating layer 7 at the rear of the magnetic recording head, and reaches the trading pole at the rear of the monopole of the magnetic recording head.

The magnetic field generated by the monopole of the magnetic recording head is dispersed to the space between the magnetic recording head and the surface of the lubricating layer 7, the lubricating layer 7, the protective layer 6, and the magnetic recording film 5, and is converged in the soft magnetic underlying layer 3 due to the high magnetic permeability. Therefore, in order to obtain high magnetic field intensity in the magnetic recording film 5, the distance of distribution is desirably shorter. Particularly in the magnetic recording film 5, a magnetic field is applied uniformly in a film thickness direction, whereby recording by magnetization inversion can be performed stably. Therefore, it is desirable that the thickness of the magnetic recording film 5 be as thin as possible with a thickness sufficient for securing the output during reproduction.

Figure 2B:
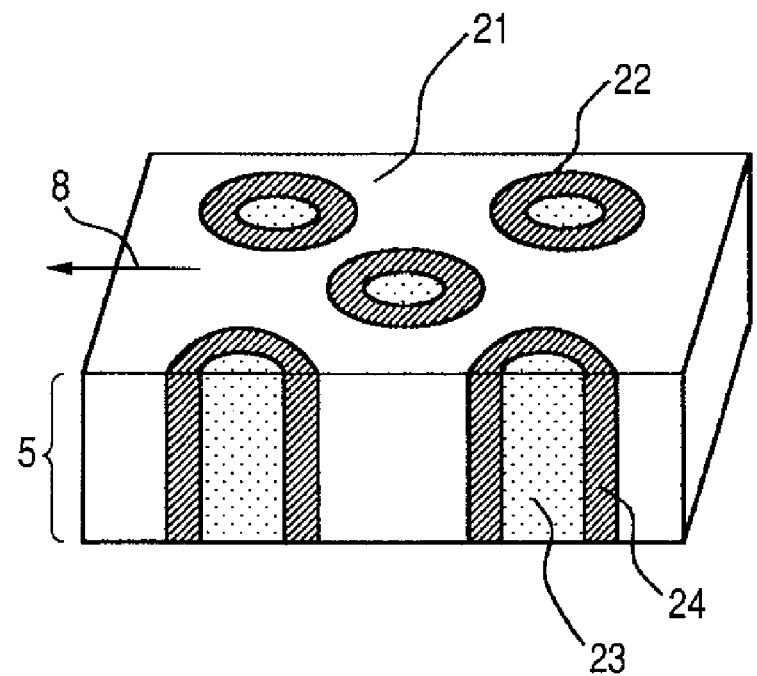

FIGS. 2A and 2B are schematic views illustrating an embodiment of the magnetic recording film of the magnetic recording medium. FIG. 2A illustrates a configuration of a magnetic recording film of a first embodiment, and FIG. 2B illustrates a configuration of a magnetic recording film of a second embodiment.

In FIGS. 2A and 2B, reference numeral 5 denotes a magnetic recording film as in FIG. 1. In FIGS. 2A and 2B, the magnetic recording film includes magnetic regions 22, a non-magnetic material 21 for magnetically separating the respective magnetic regions 22, a second magnetic portion (hereinafter, referred to as soft magnetic layer) 23 made of a soft magnetic material and constituting the magnetic region 22, and a first magnetic portion (hereinafter, referred to as hard magnetic layer) 24 made of a hard magnetic material and constituting the magnetic region 22.

The feature of the magnetic regions 22 lies in that the first magnetic portion and the second magnetic portion are laminated from in and out by two layers or more in a direction parallel to the film surface of the magnetic recording film, and that each magnetic region 22 is formed of the soft magnetic layer 23 and the hard magnetic layer 24. Further, the feature of the magnetic regions 22 according to the present invention lies in that the magnetic regions 22 are present under the condition of being separated magnetically in the direction parallel to the film surface of the magnetic recording film.

Because of the above, the size of magnetic particles in a film thickness direction of the magnetic recording film 5 does not increase even when the soft magnetic layer 23 is provided to enhance recording sensitivity. Thus, the thickness of the magnetic recording film 5 can be made smaller than that of the conventional example.

The first embodiment of the present invention includes the soft magnetic layer 23 in a direction 8 parallel to the film surface of the magnetic recording film, along the outer diameter of a cylindrical magnetic structure with the hard magnetic layer 24 as an inner diameter (FIG. 2A). Further, the second embodiment of the present invention includes the hard magnetic layer 24 in the direction 8 parallel to the film surface of the magnetic recording film, along the outer diameter of the cylindrical magnetic structure with the soft magnetic layer 23 as an inner diameter (FIG. 2B).

The layer configuration of the magnetic region 22 in the direction parallel to the film surface of the magnetic recording film according to the present invention is not limited to a two-layer configuration, and can employ a multi-layered configuration formed of a layer group with magnetic characteristics of soft magnetism and a layer group with magnetic characteristics of hard magnetism. However, for convenience of description, the present invention will be described by way of the present embodiment.

The difference between the soft magnetic layer 23 and the hard magnetic layer 24 is caused by the difference of the magnitude of average magnetic anisotropic energy density therebetween. The soft magnetic layer refers to one having average magnetic anisotropic energy density smaller than that of the hard magnetic layer. More specifically, the hard magnetic layer and the soft magnetic layer according to the present invention refer to those having a ratio k:

$$\kappa \frac{Ku2}{Ku1} \quad (3)$$

of an average magnetic anisotropic energy density Ku2 of the soft magnetic layer to an average magnetic anisotropic energy density Ku1 of the hard magnetic layer smaller (k<μ) than a ratio μ:

$$\mu \frac{Ms2}{Ms1} \quad (4)$$

of an average saturation magnetization Ms2 of the soft magnetic layer to an average saturation magnetization Ms1 of the hard magnetic layer.

When the present invention employs a multi-layered configuration formed of a layer group with magnetic characteristics of soft magnetism and a layer group with magnetic characteristics of hard magnetism, the average saturation magnetization and average magnetic anisotropic energy density of the entire hard magnetic layer group are set as the average saturation magnetization and average magnetic anisotropic energy density of the hard magnetic layer. The average saturation magnetization and average magnetic anisotropic energy density of the entire soft magnetic layer group are set as the average saturation magnetization and the average magnetic anisotropic energy density of the soft magnetic layer.

The difference in the average magnetic anisotropic energy density and the average saturation magnetization may be caused by the difference in constituent elements of the constituent materials for the soft magnetic layer and the hard magnetic layer. Further, the difference in the average magnetic anisotropic energy density and the average saturation magnetization may be caused by the difference in a composition ratio of constituent elements of the constituent materials for the soft magnetic layer and the hard magnetic layer. Further, the difference in the average magnetic anisotropic energy density and the average saturation magnetization may be caused by the difference in crystal structure of the constituent materials for the soft magnetic layer and the hard magnetic layer. Further, the difference in the average magnetic anisotropic energy density and the average saturation magnetization may be generated among the soft magnetic layers and the hard magnetic layers due to a combination of the above-mentioned factors.

The magnetic anisotropic energy density and the saturation magnetization of the soft magnetic layer and the hard magnetic layer may be differed depending upon a place in each layer.

The magnetic regions 22 form a magnetic recording information pattern on the magnetic recording film 5 as constituent elements of the magnetic recording film 5. The information recording pattern may be formed of a plurality of magnetic regions 22 as in a conventional granular medium. In this case, the arrangement of the magnetic regions 22 in the magnetic recording film 5 may be irregular, and the cross-sectional shape size of each of the magnetic regions 22 on the magnetic recording film 5 may have a variation to some degree. However, the cross-sectional size of the magnetic regions 22 is desirably small so as to enhance recording density. In this case, when the coupling between the magnetic regions 22 is large, a recording pattern is disturbed to generate recording noise. However, the generation of the noise can be suppressed since the magnetic regions 22 are magnetically separated by the non-magnetic material 21 in the present invention.

Further, an information recording pattern unit may be composed of a single magnetic region 22 as in a patterned medium. In this case, when equivalent recording density is to be obtained, the cross-sectional size of the magnetic regions 22 may be set larger than that in the case where the information recording pattern is formed of the plurality of magnetic regions 22 as described above. It is desirable that the arrangement of the magnetic regions 22 in the magnetic recording film 5 be regular, and that the cross-sectional size of the magnetic regions 22 be aligned.

In this embodiment, the magnetization in the magnetic regions 22 takes either an upward or downward direction substantially perpendicular to a film surface such that the magnetic recording film 5 becomes a perpendicular magnetic film. This is achieved by setting the magnetic anisotropy magnetization easy axis of the hard magnetic layer 24 in the magnetic region 22 to be perpendicular to the film surface of the magnetic recording film 5, and setting the film thickness of the soft magnetic layer 23 small. When the average magnetic anisotropic energy density of the soft magnetic layer 23 is not so small as compared with that of the hard magnetic layer 24, it is desirable to set the magnetic anisotropy magnetization easy axis of the soft magnetic layer 23 to be perpendicular to the film surface of the magnetic recording film 5.

The retention of the magnetization direction in the magnetic region 22 is determined by the magnitude of average magnetic anisotropic energy density of the hard magnetic layer 24 by setting the film thickness of the soft magnetic layer 23 small. The retention characteristics of the magnetization direction are enhanced by setting the average magnetic anisotropic energy density of the hard magnetic layer 24 large. In particular, the "thermal fluctuation" is determined by a product (Ku1·V1) of a magnitude Ku1 of the average magnetic anisotropic energy density of the hard magnetic layer 24 and a volume V1 thereof. Therefore, the hard magnetic layer 24, that is, the magnetic region 22 can be rendered small by using a material with large Ku1, and the resolution of the medium is enhanced, which is desirable in terms of the increase in recording density and reduction in noise of the medium.

It is desirable that, as a material constituting the hard magnetic layer 24, a magnetic material with large average magnetic anisotropic energy density, in particular, FePt, FePd, CoPt, and CoPd having an L10 regularized structure occupy a part of the layer. The present invention is not limited to the above-mentioned materials and any other material may be used as long as the hard magnetic layer 24 is provided with the average magnetic anisotropic energy density. In particular, a part of the layer may have another crystal structure, or an alloy containing a combination of Fe, Co, Pt, and Pd, or other elements may be contained in a part or an entirety of the layer.

In general, if the value of Ku·V/kT is 100 or more, it is considered that there is no problem in recording retention with respect to the "thermal fluctuation" in terms of practical use. By using the above-mentioned magnetic material for the hard magnetic layer 24, the average magnetic anisotropic energy density of about $1 \times 10^7$ erg/cc can be obtained although it depends upon the production condition, so the volume of the hard magnetic layer 24 only needs to be about 400 $nm^3$ or more. The upper limit of the volume of the hard magnetic layer 24 can be as small as possible in terms of the high recording density and medium noise. Further, if the hard magnetic layer 24 has a volume sufficient for generating domain walls in the hard magnetic layer 24, the degradation in magnetization retention characteristics and recording characteristics is caused, so the hard magnetic layer 24 desirably has such a size that domain walls are not formed. The size may be about twice as large as a critical size radius Rh of a single magnetic domain of the hard magnetic material expressed by Formula (1), although it depends upon the average magnetic anisotropic energy density and saturation magnetization of the hard magnetic layer 24 (i.e., several ten nanometers to several hundred meters).

In terms of the convergence of a magnetic field from the magnetic recording head during recording, the magnetic recording film 5 may be thinner. Based on the ability of the current magnetic recording head, the magnetic recording film 5 has a thickness of about 100 nm or less, preferably 50 nm or less, and more preferably 20 nm or less. Even in this embodiment, the size of the hard magnetic layer 24 in the magnetic recording film thickness direction is about 100 nm or less, preferably 50 nm or less, more preferably 30 nm or less, and is preferably 1 nm or more in terms of a production advantage. When the magnetic recording film 5 has a thickness of less than 1 nm, the production becomes difficult, and the area in the direction of a magnetic recording film surface becomes too large to obtain the volume sufficient for preventing the recording degradation ascribed to "thermal fluctuation", which is disadvantageous in terms of recording density and medium noise. More preferably, 5 nm or more to 30 nm or less is preferable. Further, even when the magnetic recording film 5 has a thickness of less than 1 nm, the effect of the present invention is not lost.

The cross-sectional shape of the hard magnetic layer 24 on the magnetic recording film 5 may be arbitrary. However, when the cross-sectional shape is extremely anisotropic, the connection between the hard magnetic layer 24 and the soft magnetic layer 23 is degraded, anisotropy is caused in magnetization retention characteristics, or the shape of the magnetic region 22 becomes anisotropic to generate medium noise, which is undesirable. In FIGS. 2A and 2B, the cross-sectional shape of the hard magnetic layer 24 is substantially circular. However, the cross-sectional shape may be of a substantially oval shape, a polygon shape or a teardrop shape, as long as the aspect of the outer circumference of the cross-section does not become an extreme value (preferably 10 or less). As for the cross-sectional size (a diameter or a diameter of a circumcircle), $Ku1 \cdot V/kT$ only needs to be 100 or more, considering the size in the direction of the magnetic recording film thickness and the magnitude $Ku1$ of the average magnetic anisotropic energy density of the hard magnetic layer 24. The increase in the cross-sectional size is disadvantageous for recording density and medium noise. Therefore, the cross-sectional size is 1 nm or more to 100 nm or less, preferably 2 nm or more to 30 nm or less in diameter.

For example, in the case of a cross-section of a circle, the above-mentioned conditions are satisfied when the diameter is about 10 nm or more with the size in the direction of the magnetic recording film thickness of 5 nm, and the diameter is about 4 nm or more with the size in the direction of the magnetic recording film thickness of 30 nm, at the average magnetic anisotropic energy density of $1 \times 10^7$ erg/cc. Further, the pit interval satisfying a recording density of 1 terabit per square inch is 25 nm, so the diameter can be about 15 nm or less for obtaining high density. However, it is effective even if the diameter exceeds this value. If the average magnetic anisotropic energy density is further enhanced, a further smaller size can be realized.

As the thickness of the soft magnetic layer 23 increases, the volume of the soft magnetic layer 23 increases, and the magnetization is inverted in a weak recording magnetic field during recording, so recording sensitivity can be enhanced. On the other hand, when the thickness of the soft magnetic layer 23 increases, a domain wall is generated, or a distribution in a magnetization direction is caused in the soft magnetic layer 23, with the result that the magnetization is not rotated even during inversion. In general, a value twice as large as the critical radius Rs of a single magnetic domain of the soft magnetic material can be used as a measure for a size in which the magnetization direction is aligned in the soft magnetic layer 23, and the critical radius Rs can be estimated using Formula (2) although it depends upon As and Mss which are magnetic characteristics of the soft magnetic layer 23. The upper limit of the thickness of the soft magnetic layer 23 obtained by Formula (2) is 10 nm to 100 nm, although it depends upon the material for the soft magnetic layer 23. Further, when the thickness of the soft magnetic layer 23 becomes large, the diameter of the magnetic region 22 increases, which is not desirable in terms of medium noise and high density. In view of the above, the thickness of the soft magnetic layer 23 is 10 nm or less, preferably 5 nm or less.

On the other hand, the lower limit of the thickness of the soft magnetic layer 23 is determined mainly by production conditions, and can be 0.1 nm or more. The effect of the enhancement of recording sensitivity decreases as the thickness of the soft magnetic layer 23 becomes smaller. However, according to the calculation described later, although it depends upon the material of the soft magnetic layer 23, about 10% of the enhancement of recording sensitivity can be expected even with a thickness of about 0.2 nm depending upon the conditions.

Regarding the material for the soft magnetic layer 23, the effect of the enhancement of recording sensitivity becomes larger as the average magnetic anisotropic energy density becomes smaller and as the saturation magnetization becomes larger. However, the average magnetic anisotropic energy density of the soft magnetic layer 23 only needs to be about ½ or less as that of the hard magnetic layer 24, preferably ⅒ or less. The material for the soft magnetic layer 23 may be different from that for the hard magnetic layer 24. Further, all or a part of the elements constituting the soft magnetic layer 23 can be made different from those constituting the hard magnetic layer 24. Alternatively, the composition ratio of the elements constituting the soft magnetic layer 23 can be made different from the composition ratio of the elements constituting the hard magnetic layer 24. Alternatively, the main crystal structure of the soft magnetic layer 23 can be made different from that of the hard magnetic layer 24. By any of the above or a combination of the above, the average magnetic anisotropic energy density and saturation magnetization of the soft magnetic layer 23 can be made different from those of the hard magnetic layer 24.

For example, in the case of using FePt, FePd, CoPt, and CoPd having the L10 regularized structure in the hard magnetic layer 24, the soft magnetic layer 23 can be made of a soft magnetic material such as an NiFe alloy (permalloy) or a CoFe alloy. Further, the hard magnetic layer 24 can be made of FePt that has the L10 regularized structure, and the soft magnetic layer 23 can be made of any of FePt, $Fe_3Pt$, and $FePt_3$ alloys that have the same constituent elements. Further, for example, the hard magnetic layer 24 can be made of FePt having the L10 regularized structure, and the soft magnetic layer 23 can have a non-regularized structure of the same FePt.

With the above-mentioned configuration of the magnetic region 22, the following effects are obtained.

First, regarding the "thermal fluctuation", the magnetic regions 22 serve as single magnetic domain particles that rotate substantially in a simultaneous manner due to its small size. Since the soft magnetic layer 23 has small magnetic anisotropic energy density, the durability $Ku1 \cdot V1/kT$ regarding the "thermal fluctuation" can take an index of 100 or more, although it is determined mainly by a volume V1 and the average magnetic anisotropic energy density of the hard magnetic layer 24.

Regarding the recording, similarly, the magnetic regions 22 serve as single magnetic domain particles that rotate substantially in a simultaneous manner. At this time, a minimum value $H_{min}$ of a recording magnetic field causing the inversion of simultaneous rotation is as follows.

$$H\min = 2\frac{Ku1 \cdot V1 + Ku2 \cdot V2}{Ms1 \cdot V1 + Ms2 \cdot V2} = 2\frac{Ku1}{Ms1}\frac{1+\kappa\left(\frac{V2}{V1}\right)}{1+\mu\left(\frac{V2}{V1}\right)} \quad (5)$$

Herein, Ku1 represents magnetic anisotropic energy density (unit: erg/cc) of the hard magnetic layer 24, and Ku2 represents magnetic anisotropic energy density (unit: erg/cc) of the soft magnetic layer 23. Ms1 represents the saturation magnetization (unit: emu/cc) of the hard magnetic layer 24, and Ms2 represents the saturation magnetization (unit: emu/cc) of the soft magnetic layer 23.

V1 represents a volume (unit: cm³) of the hard magnetic layer 24, V2 represents a volume (unit: cm³) of the soft magnetic layer 23, and k represents a ratio of magnetic anisotropic energy density of Formula (3). μ represents a ratio of saturation magnetization of Formula (4).

On the other hand, the minimum value $H_{min}0$ of the recording magnetic field in the case of only the soft magnetic layer 23 is as follows.

$$H_{min}0 2\frac{Ku1}{Ms1} \quad (6)$$

Therefore, when $k<\mu$, $H_{min}<H_{min}0$ is satisfied, the magnitude of a recording minimum magnetic field becomes small, and the recording sensitivity is enhanced. Further, when the value of k and μ is the same, the degree of increase in sensitivity becomes larger as the volume ratio V2/V1 of the hard magnetic layer 24 to the soft magnetic layer 23 becomes larger.

Table 1 shows values of $H_{min}/H_{min}0$ when the volume ratio V2/V1 of the soft magnetic layer 23 to the hard magnetic layer 24 is varied with respect to various k and μ satisfying k<μ. It can be seen that, if the ratio μ of average saturation magnetization is about 0.5, an effect can be obtained even if the average magnetic anisotropic energy density is about ¼. Further, it can be seen that, even when the ratio of average saturation magnetization is small, an effect can be obtained if the ratio of k is set small.

TABLE 1

| | | V2/V1 | | | | |
|---|---|---|---|---|---|---|
| k | μ | 0 | 0.25 | 0.5 | 1 | 1.25 |
| 0 | 1 | 1 | 0.80 | 0.67 | 0.50 | 0.44 |
| 0.1 | 1 | 1 | 0.82 | 0.70 | 0.55 | 0.50 |
| 0.5 | 1 | 1 | 0.90 | 0.83 | 0.75 | 0.72 |
| 0 | 0.5 | 1 | 0.89 | 0.80 | 0.67 | 0.62 |
| 0.1 | 0.5 | 1 | 0.91 | 0.84 | 0.73 | 0.69 |
| 0.25 | 0.5 | 1 | 0.94 | 0.90 | 0.83 | 0.81 |
| 0.001 | 0.1 | 1 | 0.98 | 0.95 | 0.91 | 0.89 |
| 0.005 | 0.1 | 1 | 0.98 | 0.95 | 0.91 | 0.89 |
| 0.01 | 0.1 | 1 | 0.98 | 0.96 | 0.92 | 0.90 |

Table 2 shows ratios of the thickness of the soft magnetic layer 23 to the radius of the hard magnetic layer 24 for obtaining a volume ratio V2/V1 of the soft magnetic layer 23 to the hard magnetic layer 24 shown in Table 1 when the hard magnetic layer 24 is placed inside and the soft magnetic layer is placed outside so as to surround the hard magnetic layer 24 in the first embodiment illustrated in FIG. 2A. For reference, Table 2 also shows ratios of the thickness of the soft magnetic layer to the thickness of the hard magnetic layer for obtaining a similar volume ratio in the case of a stack configuration of a conventional example. They are compared assuming that the equal durability of "thermal fluctuation" is obtained with the volume of the hard magnetic layer 24 being the same.

TABLE 2

| Volume ratio V2/V1 | Diameter of hard magnetic layer according to first embodiment | Thickness of soft magnetic layer according to first embodiment | Diameter of magnetic region according to first embodiment | Thickness of soft magnetic film according to conventional example |
|---|---|---|---|---|
| 0.25 | 1 | 0.12 | 1.12 | 0.25 |
| 0.5 | 1 | 0.22 | 1.22 | 0.5 |
| 1 | 1 | 0.41 | 1.41 | 1 |
| 1.25 | 1 | 0.50 | 1.50 | 1.25 |

The unit of diameters of the hard magnetic layer and the soft magnetic layer is nm, and the unit of thicknesses of the hard magnetic layer and the soft magnetic layer is nm.

Table 3 shows diameters of the soft magnetic layer 23 and the thicknesses of the hard magnetic layer 24 for obtaining a volume ratio V2/V1 of the soft magnetic layer 23 to the hard magnetic layer 24 shown in Table 1 when the soft magnetic layer 23 is placed inside and the hard magnetic layer 24 is placed outside so as to surround the soft magnetic layer 23 in the second embodiment illustrated in FIG. 2B. Numerical values are compared assuming that equal durability of "thermal fluctuation" can be obtained when the volume, with which a magnetic region having the same volume with only the hard magnetic layer is configured, is 1, and the volume of the hard magnetic layer 24 being the same. In the same manner as in Table 2, Table 3 also shows ratios between the film thickness of the soft magnetic layer and the film thickness of the hard magnetic layer for obtaining a similar volume ratio in the case of the stack configuration of the conventional example.

TABLE 3

| Volume ratio V2/V1 | Diameter of soft magnetic layer according to second embodiment | Thickness of hard magnetic layer according to second embodiment | Diameter of magnetic region according to second embodiment | Thickness of soft magnetic film according to conventional example |
|---|---|---|---|---|
| 0.25 | 0.50 | 0.62 | 1.12 | 0.25 |
| 0.5 | 0.71 | 0.52 | 1.22 | 0.50 |
| 1 | 1.00 | 0.41 | 1.41 | 1.00 |
| 1.25 | 1.12 | 0.38 | 1.50 | 1.25 |

With regard to Tables 1 and 2, in the first embodiment, the average magnetic anisotropic energy density of the soft magnetic layer 23 and the hard magnetic layer 24 is set from $1/10$ to about $1/2$, and the saturation magnetization is set from about $1/10$ to about $1/2$. Then, the thickness of the soft magnetic layer 23 is set to be about $1/2$ of a radius (about $1/4$ of a diameter). Consequently, the required recording magnetic field can be reduced by 50% to 30%. Further, it can be seen from Table 3 that the same effects can also be obtained in the second embodiment.

As more specific examples, FIG. 10 illustrates a graph of calculated values of recording sensitivity in the case where the soft magnetic layer is provided on the cylindrical hard magnetic layer 24 (diameter: 8 nm, height: 10 nm) in a film thickness direction in the conventional example, and in the case where the soft magnetic layer 23 is provided in a magnetic recording film surface direction in accordance with the first embodiment of the present invention. The magnetic anisotropic energy density of the soft magnetic layer was set to zero. The upper-side scale of the graph represents the height obtained by laminating the soft magnetic layer on the hard magnetic layer 24 in the case of the conventional example, which corresponds to the thickness of a magnetic recording film. The lower-side scale of the graph represents a diameter obtained by providing the soft magnetic layer 23 on the outer circumference of the hard magnetic layer 24 in the case of the first embodiment of the present invention, which corresponds to the diameter of the magnetic region 22.

The diameter of 8 nm and the height of 10 nm, which are given as examples, are pursuant to an experimental example shown in "Official Journal of The Magnetics Society of Japan" vol. 29, 2005, pages 239-242 by The Magnetics Society of Japan, and a magnetic recording film thickness of 10 nm produced with those dimensions is satisfactory in terms of the recording head performance. Further, the magnetic region of 10 nm or less is also a preferable numerical value in terms of recording noise, and the value of this example is sufficiently practical as an embodiment.

As illustrated in the graph of FIG. 10, the magnetic field sensitivity can be enhanced by about 40% by substantially doubling the recording layer thickness (i.e., increasing the recording layer thickness from 10 nm to 19 nm) in the conventional example. In the first embodiment of the present invention, however, the same effect can be obtained by increasing the diameter from 8 nm to 10.5 nm. The thickness of the soft magnetic layer 23 is 1.25 nm at this time. By adding about 1 nm of the soft magnetic layer 23 on the outer circumference of the hard magnetic layer 24, the effect which is comparable to that obtained by substantially doubling the magnetic recording film thickness in the conventional example can be obtained.

As described above, according to the present invention, nearly the same effect as that in the conventional example can be obtained by adding the soft magnetic layer with a thickness of about 1 nm, without largely increasing the recording layer thickness as in the conventional example.

Next, a method of producing a magnetic recording medium of the present invention will be described.

The present invention mainly relates to the configuration of the magnetic recording film 5. Layers starting from the substrate 1 to the soft magnetic underlying layer 3 that correspond to a lower structure of the magnetic recording film 5, and the protective layer 6 and the lubricating layer 7 that correspond to an upper structure thereof can be produced by the same production method as that of the conventional perpendicular recording medium for an HDD. Therefore, detailed description thereof will be omitted. Further, regarding the production of the magnetic recording film 5, the non-magnetic layer 4 may be used as an underlying layer with respect to the magnetic recording film 5. Therefore, the following description mainly deals with the magnetic recording film 5 and the non-magnetic layer 4.

The magnetic recording film 5 of this embodiment is a structure formed of the non-magnetic material 21, the soft magnetic layer 23, and the hard magnetic layer 24. Such a structure developed on the surface of the magnetic recording film 5 can also be produced by patterning using resist light exposure used in a semiconductor process. Further, it is desirable to produce a desired structure by the following method, using a nano-hole production method disclosed in Japanese Patent Application Laid-Open No. 2004-237429 and Japanese Patent Application Laid-Open No. 2002-175621.

Figure 6:
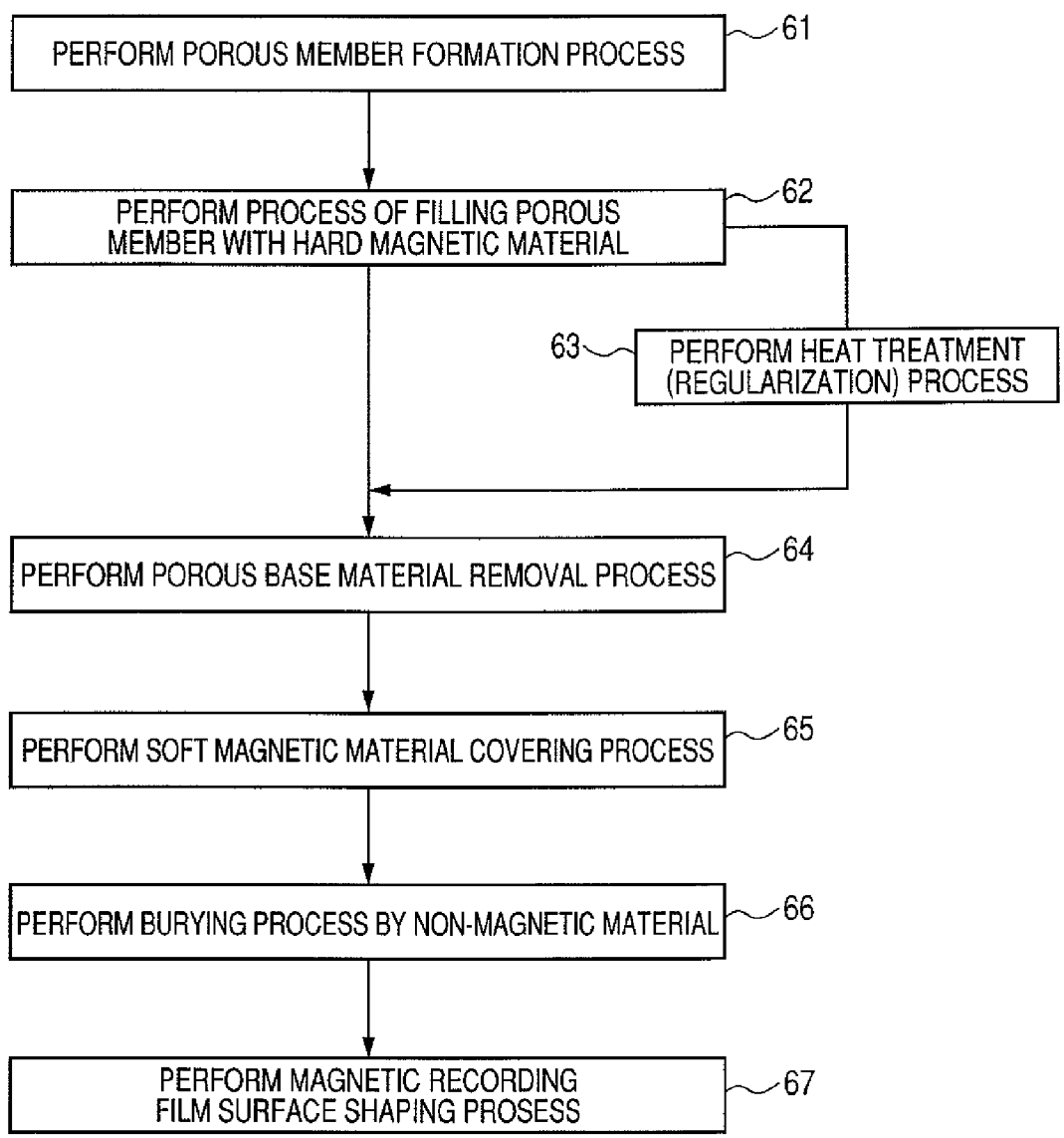
FIG. 6 is flowchart of a first method of producing a magnetic recording film of a first embodiment of the magnetic recording medium of the present invention.

FIG. 6 illustrates a flowchart of a first method of producing a magnetic recording film 5 of the first embodiment of the magnetic recording medium of the present invention.

Figure 7:
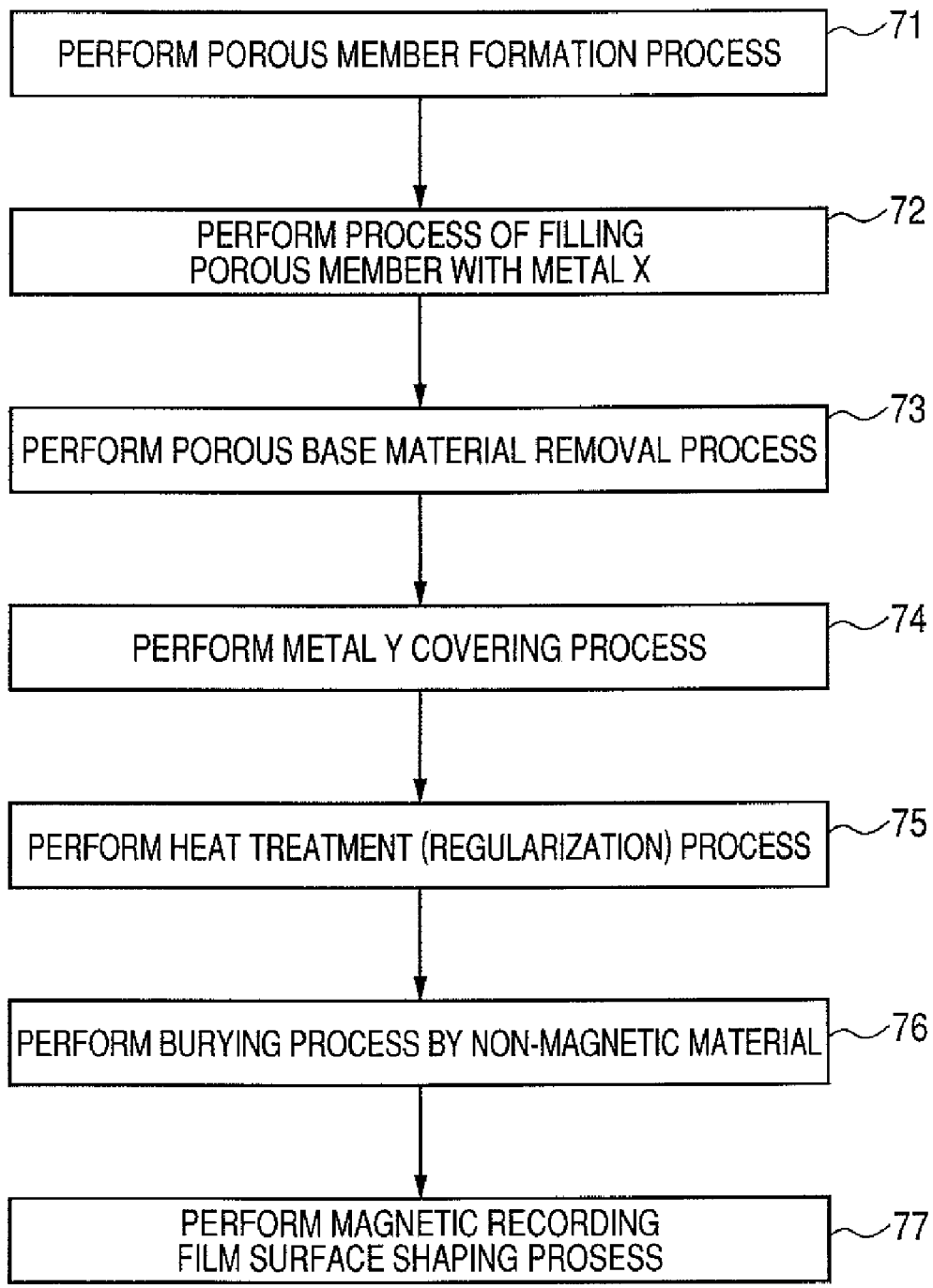
FIG. 7 is a flowchart of a second method of producing a magnetic recording film of the first embodiment of the magnetic recording medium of the present invention.

FIG. 7 illustrates a flowchart of a second method of producing a magnetic recording film 5 of the first embodiment of the magnetic recording medium of the present invention.

First, the outline of the first production method illustrated in FIG. 6 will be described. On the soft magnetic underlying layer 3, the non-magnetic layer 4 and a porous member that later constitutes the magnetic recording film 5 are produced (porous member formation process 61). Next, holes in the porous member are filled with a hard magnetic material constituting the hard magnetic layer 24 (hard magnetic material filling process 62). Next, a part of base material portion of the porous member is removed to expose the hard magnetic material portion (porous base material removal process 64). Next, the exposed hard magnetic material portion is covered with a soft magnetic material constituting the soft magnetic layer 23 (soft magnetic material covering process 65). The hard magnetic material portion covered with the soft magnetic material, which constitutes the magnetic region, is buried by a non-magnetic material (burying process 66 with respect to non-magnetic material). Finally, the surface portion is shaped to obtain the magnetic recording film 5 (magnetic recording film surface shaping process 67).

The above-mentioned hard magnetic material may be a general hard magnetic material with high magnetic anisotropic energy density. In particular, by using FePt, FePd, CoPt, and CoPd having the L10 regularized structure, high magnetic anisotropic energy density can be ensured. In this case, it is desirable to include a process of allowing the L10-ordering to proceed in the material by heat treatment after filling the holes of the porous member with the material (regularization process 63).

Further, the above-mentioned soft magnetic material may be a general soft magnetic material with low magnetic anisotropic energy density and high saturation magnetization Ms, and an NiFe alloy (permalloy) can also be used. Further, considering the material coupling property with respect to the hard magnetic layer 24, the soft magnetic layer 23 with small magnetic anisotropic energy density can be configured by using a metal material that is not regularized and contains Fe or Co, and Pt or Pd.

According to the second production method illustrated in FIG. 7, in the same way as in the first production method, on the soft magnetic underlying layer 3, the non-magnetic layer 4 and a porous member that later constitutes the magnetic recording film 5 are formed (porous member formation process 71). Holes of the porous member are filled with first metal X that generates FePt, FePd, CoPt, and CoPd with the L10 regularized structure in the later regularization process to become the hard magnetic layer 24 (metal X filling process 72). Next, a part or an entirety of a base material portion of the porous member is removed to expose the first metal X (porous base material removal process 73). Next, second metal Y constituting the soft magnetic layer 23 is laminated on the exposed metal X (metal Y covering process 74). After that, the L10-ordering is allowed to proceed mainly in the hard magnetic layer 24 by heat treatment such that the magnetic anisotropic energy density mainly in the hard magnetic layer 24 portion is enhanced relatively, and the saturation magnetization of the soft magnetic layer 23 portion is kept relatively high (regularization process 75). Consequently, a ratio k of the average magnetic anisotropic energy density Ku2 of the soft magnetic layer 23 to the average magnetic anisotropic energy density Ku1 of the hard magnetic layer 24 becomes smaller than a ratio µ of the average saturation magnetization Ms2 of the soft magnetic layer 23 to the average saturation magnetization Ms1 of the hard magnetic layer 24. Finally, the hard magnetic layer 24 covered with the soft magnetic layer 23, which constitutes the magnetic region is buried by a non-magnetic material in the same way as in the first production method (burying process 76 with respect to the non-magnetic material), and the surface portion is shaped to obtain the magnetic recording film 5 (magnetic recording film surface shaping process 77).

Particularly, the second production method includes the process of preparing a thin film formed of a large number of columnar members perpendicular to a film surface and made of metal X mainly containing either Pt or Pd and a base material surrounding the columnar members, the process of removing an upper portion or the whole portion of the base material, the process of covering the periphery of the metal X, whose surface is exposed by the removal of the base material, with metal Y including either Fe, Co, or Ni, and the process of forming an L10 regularized alloy layer containing the metal X and the metal Y by heat treatment.

Hereinafter, each process will be described specifically with reference to FIGS. 3A to 3J. FIGS. 3A to 3J are process views illustrating an example of a method of producing a magnetic recording film of a magnetic recording medium according to the present invention.

First, the non-magnetic layer 4 is formed on the soft magnetic underlying layer 3. The non-magnetic layer 4 can have a function of controlling alignment such that the magnetic recording film 5 becomes a perpendicular magnetic recording film. Further, electroplating is used in the soft magnetic material covering process 65 of the first production method, and the non-magnetic layer 4 is used as a part of an electrode in the case where electroplating is used in the metal Y covering process 74 in the second production method, so the non-magnetic layer 4 is required to have conductivity. In the case of using electroless plating in the metal Y covering process 74 in the second production method, the non-magnetic layer 4 is not required to have conductivity.

On the other hand, when the soft magnetic material adheres directly to the non-magnetic layer 4 during the covering process, a magnetic coupling occurs between the magnetic regions, which is not desirable for recording characteristics of the magnetic recording film 5. Therefore, it is necessary that the nonmagnetic layer 4 is provided with conductivity, and in the case of using electroplating in the soft magnetic material covering process 65 or the metal Y covering process 74, a part of the base material in the vicinity of the magnetic recording film 5 still remains after the base material is removed in the porous base material removal process 64.

For controlling alignment, an alignment control layer made of MgO in a (001) alignment is inserted in the non-magnetic layer 4, and an electrode layer for plating is further provided on the alignment control layer. Further, it is also possible to use ZnO which functions as the alignment control layer and the electrode layer. Herein, in order to control the alignment of the magnetic material to be filled into the holes, it is desirable to align the underlying electrode layer in the (001) alignment.

Particularly in the case of using the L10 regularized alloy with large magnetic anisotropic energy density as the hard magnetic material, the underlying electrode layer can have a square crystal arrangement in parallel with the substrate surface so as to align a c-axis of the L10 regularized alloy layer in the magnetic substance in a direction perpendicular to the substrate. In particular, the (001) alignment of an fcc structure can be used.

For example, the non-magnetic layer 4 can be set to be an alignment control layer made of MgO with a (001) alignment. Further, it is also desirable that the lowermost layer of the non-magnetic layer 4 be set to be the alignment control layer made of aligned MgO, and a layer obtained by epitaxially growing a Pt film or a Pb film having a (001) alignment based on the alignment control layer be set to be the non-magnetic layer 4. As described later, the second production method has the object of producing an alloy using the heat diffusion of Pt, Pd, Fe, and Co. Therefore, in order to prevent Pt and Pd in the non-magnetic layer 4 from contributing to the formation of a regularized alloy, it is also possible to use a material such as Cu or Ag for the non-magnetic layer 4. For control of alignment, it is also possible to use ZnO with a c-axis alignment. Herein, in order to control the alignment of a magnetic material to be filled into the holes, it is desirable to use a material with an fcc structure for the underlying layer and to align it with a (111) or (001) alignment. The (001) alignment is most desirable.

Further, in the case where the non-magnetic layer 4 contains Pt or Pd, in order to prevent those metals from being diffused to the soft magnetic underlying layer 3, a protective layer made of Ti can be configured using a lower layer portion of the non-magnetic layer 4 as an underlying layer.

(1) Porous Member Formation Process

First, a film constituting the magnetic recording film 5 is formed on the non-magnetic layer 4, and a plurality of holes are formed in the film surface thereof. This process is common in both the first production method and the second production method. Therefore, this process will be descried as one common process in both the production methods (61 in FIGS. 6 and 71 in FIG. 7).

Figure 3A:
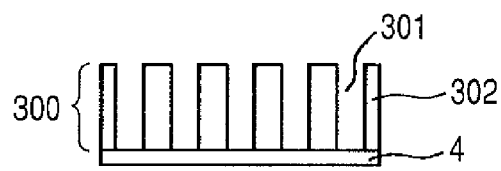
FIGS. 3A, 3B, 3C, 3D, 3E, 3F, 3G, 3H, 3I, and 3J illustrate an example of processes of a method of producing a magnetic recording film of a magnetic recording medium according to the present invention.

FIG. 3A illustrates a porous member 300 having a plurality of holes. It is assumed that the thickness of the porous member 300 is equal to or larger than that of the magnetic recording film 5. The thickness of the magnetic recording film 5 is about 100 nm or less, preferably 50 nm or less, more preferably 30 nm or less, and most preferably 5 nm or more to 30 nm or less. Therefore, the porous member 300 can be formed to have a thickness equal to or larger than that of the magnetic recording film 5, and the surface of the produced structure can be etched in a later process to adjust the film thickness. However, the porous member 300 is formed to have substantially the same thickness as that of the magnetic recording film 5.

Figure 5:
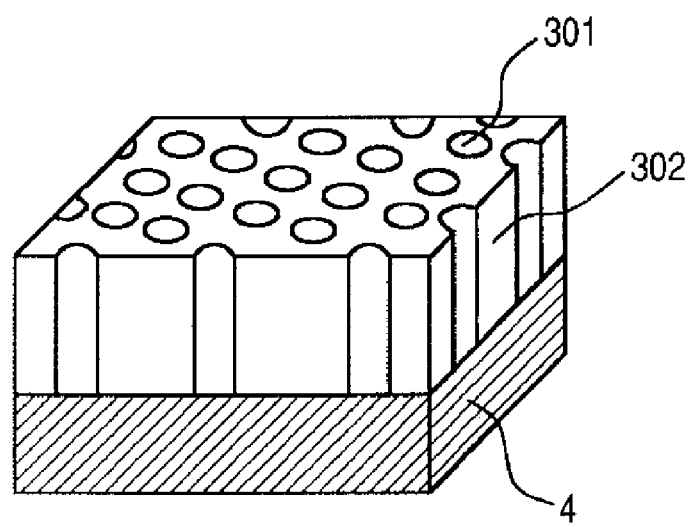
FIG. 5 is a view illustrating a porous member in the method of producing a magnetic recording film according to the present invention.

When the member is seen from an upper surface side of the hole, the holes are dispersed as illustrated in FIG. 5. In FIGS. 3A to 3J and FIG. 5, reference numeral 301 denotes holes, and 302 denotes a hole wall (base material) interposed between the holes. The holes are dispersed in the hole wall, and may be expressed as a base material (or a matrix portion). The holes 301 in FIG. 3A penetrate the non-magnetic layer 4.

In the porous member 300, the holes 301 of the porous member 300 are columnar holes, and an average diameter of the plurality of holes is assumed to be substantially equal to the diameter of the hard magnetic layer 24. The average diameter can be 2 nm or more to 30 nm or less in terms of the reduction in "heat fluctuation" effect and the increase in recording density.

More specifically, in particular, according to the first production method, in order to fill the holes 301 of the porous member 300 with the hard magnetic material which is to be the hard magnetic layer 24, the diameter of the holes 301 only needs to be the same as the desired diameter of the hard magnetic layer 24. On the other hand, according to the second production method, the first metal X filling the holes 301 of the porous member 300 and the second metal Y provided on the periphery of the first metal X are L10 regularized by heat treatment to be described later to form the hard magnetic layer 24. At that time, as described later, diffusion are generated among elements and a portion in which the magnetic anisotropic energy density is high may spread outside from the diameter which is originally filled with the first metal X. Considering the above, according to the second production method, the diameter of the holes 301 can also be made slightly smaller than the desired diameter of the hard magnetic layer 24. This difference is desirably set to be about 1 nm to 5 nm, although depending upon the diameter of the holes 301, the desired diameter of the hard magnetic layer 24, the thickness of the soft magnetic layer, and the heat treatment conditions.

As described in, for example, Japanese Patent Application Laid-Open No. 2004-237429, the porous member 300 can be obtained by forming holes by anodizing aluminum or an aluminum-containing alloy in a solution of oxalic acid or phosphoric acid. According to this method, a porous body having alumina, which is an oxide, as the hole wall is formed.

Further, as described in, for example, Japanese Patent Application Laid-Open No. 2002-175621, using a material for forming a phase separation structure, a structure in which columnar members are dispersed in a region surrounding the columnar members is formed, and a porous layer can be obtained by removing the columnar members.

It is desirable that the diameter of the holes obtained by those methods be 1 nm or more to 100 nm or less, and in particular, 1 nm or more to 30 nm or less in this embodiment.

Further, those methods are useful for producing a structure filled with a magnetic material by using a template with a diameter of 1 nm or more to 15 nm or less and an average interval between holes of 20 nm or less.

Further, the depth of the holes (thickness of the holes in the longitudinal direction) obtained by those methods is 5 nm or more to 100 nm or less, in particular 50 nm or less, and more preferably 30 nm or less.

Hereinafter, in particular, an example based on the method described in Japanese Patent Application Laid-Open No. 2002-175621 will be described in detail.

Specifically, a structure is prepared in which the peripheries of columnar members are surrounded by a region composed of a different material, and the columnar members are removed selectively. The structure contains the material constituting the region in a ratio of 20 atomic % or more to 70 atomic % or less with respect to the total amount of the material constituting the columnar members and the material constituting the region. With the above-mentioned range of ratio, a structure in which substantially columnar members are dispersed in a matrix region surrounding the columnar members is realized. Examples of the constituent material for the columnar members include Al and Mg. Examples of the material constituting the region surrounding the columnar members include Si, Ge, and a mixture of Si and Ge (hereinafter, may also be referred to as $Si_xGe_{1-x}$ (0<x<1)).

In order to obtain a structure in which those columnar members are dispersed in the region surrounding them, a non-equiliblium film formation method such as a sputtering method using a target containing both the material for the columnar members and the material for the region surrounding them is used.

After film formation, the columnar members are removed selectively. For example, in the case where the columnar members are made of Al, the columnar members are soaked in ammonia water diluted by 2.8%, whereby an Al portion is eluded to form a porous member. In addition, various acid solutions can also be used. A matrix portion is oxidized after the Al columnar members are dissolved to form $SiO_2$ or $GeO_2$, and a mixture of $SiO_2$ and $GeO_2$.

(2) Filling Process

According to the first production method, the plurality of holes of the porous member 300 are filled with the hard magnetic material (62 in FIG. 6), and according to the second production method, the plurality of holes of the porous member 300 are filled with the first metal X, which is subjected to L10-ordering in the subsequent stage to form the hard magnetic material (72 in FIG. 7).

Figure 3B:
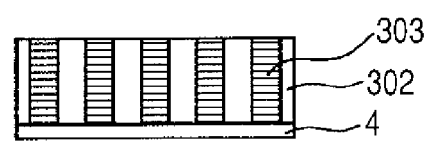

FIG. 3B illustrates a structure in which the holes 301 are filled with a capsule filler 303, and an excess filling material is removed by polishing.

According to the first production method, the capsule filler 303 is a hard magnetic material with large magnetic anisotropic energy density. The holes 301 can be filled with CoCrPt, for example, by a dry process such as a sputtering method, a CVD method, or a vapor deposition method, or a plating method. However, it is preferable that the holes 303 are filled with an L10 regularized alloy such as FePt, FePd, CoPt, or CoPd each having a larger magnetic anisotropic energy density.

Among the above-described methods, a plating method is most excellent in filling property. The non-magnetic layer 4 is allowed to contain Pt, Pd, or other conductive metal components, whereby the non-magnetic layer 4 is made an electrode. Electroplating may be conducted, by using a plating solution containing hexachloroplatinate (IV) and hexachloropalladinate as Pt and Pd materials, and salt chloride and sulfate as Fe and Co materials.

Since Fe ions in a plating bath are relatively unstable and are likely to form a precipitate, a complexing agent may also be added so as to stabilize the Fe ions. As the complexing agent, any acid is selected appropriately from tartaric acid, citric acid, succinic acid, malonic acid, malic acid, gluconic acid, and a salt thereof. In particular, it is preferable to use tartaric acid or a salt thereof and/or citric acid or a salt thereof, and sodium tartrate and/or ammonium tartrate.

Further, in order to suppress a change over time of hexachloroplatinate (IV), it is also effective to prepare a solution containing an excess amount of Cl ions such as NaCl. Further, by adding ammonium ions if required to form a complex of hexachloroplatinate (IV) ammonium to further promote the stabilization of Fe ions in the solution.

By controlling the ratio of materials to be added to the plating solution and the plating potential, a Fe or Co composition and a Pt or Pd composition are made substantially equal to each other, and are made equal to the L10 regularized composition. In general, FePt, FePd, CoPt, CoPd are yet to be L10 regularized immediately after being filled. Therefore, it is preferable to perform the heat treatment process 63 in this stage for promoting the L10-ordering, in which heat treatment is performed for several tens of minutes to several hours at 400° C. to 650° C. (regularization process 63). Further, this heat treatment is preferably performed under a reducing atmosphere, a vacuum atmosphere, or a hydrogen atmosphere in the same way as in the heat treatment process 75 according to the second production method described later. In particular, it is preferable to perform the heat treatment under a hydrogen atmosphere.

According to the second production method, the filler 303 is the first metal X containing Pt or Pd, or containing Pt and Pd as main components and containing at least one of Fe, Co, and Ni. In this case, it is possible to previously control a composition of the filler 303 so that the filler portion is subjected to L10-ordering, when the hard magnetic layer 24 is subject to L10 regularized alloying and covered with the soft magnetic layer on the outer surface in the heat treatment process (5) in the later stage. When the composition ratio of these metals increases, the filler 303 is also likely to be oxidized simultaneously with the removal of the base material 302 in the base material removal process (3) in the later stage. Therefore, it is preferable that the composition ratio of these metals does not exceed a composition ratio of Pt or Pd in total.

Particularly in the case of filling Pt and Pd, electroless plating is a preferable method; however, it is necessary to provide the porous member 100 with a catalyst layer at a hole bottom portion. Therefore, it is also preferable to use Pt and Pd for the non-magnetic layer 4. Further, electroplating also can be performed using the conductivity of the non-magnetic layer 4.

Further, a Pt layer and a Pd layer may be formed only in the bottom portions of the holes 301 after the porous member 300 is produced, without using Pt and Pd in the non-magnetic layer 4. In this case, after the porous member 300 is produced, a Pt or Pd layer is formed in the bottom portions of the holes 301 and on the surface of the base material 302 in the non-hole portion by sputtering, and the Pt layer or the Pd layer on the surface of the base material 302 in the non-hole portion may be removed by polishing.

Pt and Pd as the capsule filler 303 filled by plating grow under the influence of the alignment of the non-magnetic layer 4, but may also be influenced by impurities in the plating. In this case, after plating, heat treatment for promoting the impurity removal and the crystal growth may also be performed. For example, in the case of using the Pt or Pd (001) film for the non-magnetic layer 4, it is easy to control the alignment of Pt, Pd to be filled.

On the other hand, according to the first production method and the second production method, it is possible to use dry processes such as sputtering, CVD, and vapor deposition. In particular, an arc plasma gun is a procedure close to ion plating for forming ionized metal particles, and is verified to be a film formation procedure excellent in burying performance in formation of wiring such as Damascene. Further, the method is excellent in filling property because it applies a substrate bias.

In addition, for example, ion beam sputtering, in which particles to be deposited scatter with good linearity with respect to a substrate, is also a procedure suitable for burying in the holes. However, in the case of using a dry process, a film is formed on hole walls as well as the holes, so there is a possibility that a filling property is degraded. Therefore, in the case of using a dry process for the filling process in the first embodiment when the diameter of the hard magnetic layer 24 is 50 nm or less, it is preferable to use the dry process in the case where an aspect ratio, that is, (magnetic recording film thickness)/(hard magnetic layer), is 2 or less. More preferably, a dry process is suitably applied when the aspect ratio is 1 or less. Further, if required, a filling property can also be improved by alternately performing the process of removing the deposition on the hole walls by an etching process and the process of filling.

In the heat treatment process (5) in the later stage, the crystal alignment of the regular alloy to be obtained is strongly influenced by the crystal structure of metal forming the filler 303. For example, in order to form a structure having a FePt (001) alignment in which a c-axis is in a direction perpendicular to the surface, it is preferable to prepare Pt with an fcc crystal structure and a (001) alignment. In any case, by using the non-magnetic layer 4 as an alignment control film, Pt or Pd to be filled can have an fcc crystal structure and a (001) alignment. A portion overflown in the filling process is preferably removed by a procedure such as polishing.

(3) Base Material Removal Process

Figure 3C:
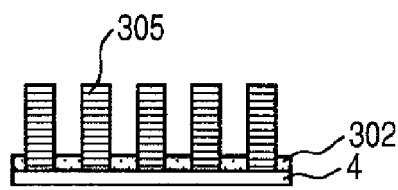

FIG. 3C illustrates a structure in which a part of a base material is removed in the porous base material removal process 64 or 73 according to the first production method or the second production method.

In the case of allowing the non-magnetic layer 4 to have conductivity as a part of an electrode so as to perform electroplating in the covering process in the later stage, or in the case of using Pt or Pd for the non-magnetic layer 4 as plating catalyst in the filling process, the base material 302 is left as illustrated in FIG. 3C. That is, by leaving the base material 302 as a template, it is necessary to prevent the non-magnetic layer 4 from being covered while the soft magnetic material and the second metal Y are covered as described later. By controlling the kind of a solution, concentration, or a temperature thereof, the dissolution speed and dissolution amount of a base material can be controlled, and a part of the base material can be left as illustrated in FIG. 3C.

Figure 3D:

On the other hand, in the case where, according to the second production method, the first metal X mainly containing Pt or Pd is used as the filler 303, and electroless plating is performed in the metal Y covering process 74 later by using the first metal X as a catalyst, the entire base material 302 may be removed as illustrated in FIG. 3D. In this case, it is not necessary to allow the soft magnetic layer 4 to have conductivity and catalyst characteristics, so the soft magnetic layer 4 is not covered with the metal Y directly, and the soft magnetic material is prevented from magnetically connecting magnetic regions to one another in the later stage.

In the case of using anodizing of aluminum in the process in FIG. 3A, the base material 302 is alumina, and in the case of using a phase separation structure, the base material 302 is Si or Ge, or an oxide of Si or Ge. Therefore, the base material 302 can be removed by using an alkaline solution such as NaOH or hydrogen fluoride.

On the other hand, Pt or Pd to be filled according to the second production method has strong corrosion resistance, and FePt, FePd, CoPt, or CoPd to be filled according to the first production is L10 regularized and the strength thereof is enhanced, and has durability with respect to any acid except for special acid such as aqua regia. Therefore, by soaking the porous member 300 in an alkaline solution such as NaOH or hydrogen fluorine, or a tetramethylammonium hydroxide (TMAH) solution, the matrix material 302 is selectively dissolved, and it is possible to produce a structure 303 in which Pt or Pd is convex in an upward direction.

(4) Covering Process

In the above-mentioned process (3), a protruding structure 305 that is convex in an upward direction is formed. According to the first production method, the protruding structure 305 is made of a hard magnetic material, and is particularly preferably made of an L1 regularized alloy of FePt, FePd, CoPt, or CoPd. Further, in the second production method, the protruding structure 305 is the first metal X mainly made of Pt or Pd.

Figure 3E:
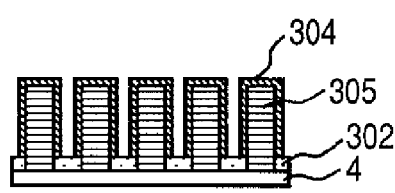

The surface of the protruding structure 305 is covered with a soft magnetic material such as permalloy according to the first production method, or with the second metal Y containing at least one kind of Fe, Co, and Ni according to the second production method, to thereby produce a structure having an outer covering 304 as illustrated in FIG. 3E.

This outer covering can be formed by covering the protruding structure 305, which is to be an electrode, by electroplating method using the protruding structure 305 as an electrode, with the outer covering 304 made of a soft magnetic material or metal Y.

As an example, the protruding structure 305 made of a hard magnetic material of an L10 regularized alloy is covered with a soft magnetic material made of permalloy according to the first production method as follows. Electroplating is performed by using, for example, a plating solution which is obtained by adding boric acid as a buffer, saccharin sodium as an additive, sodium laurylate as a surfactant to a mixed solution of nickel sulfate, nickel chloride, and iron sulfate. As a result, permalloy can be laminated on the protruding structure 305. The composition ratio between Fe and Ni of the permalloy can be controlled mainly by a voltage and a component of the iron sulfate in the plating solution.

According to the first production method, the thickness of the soft magnetic material to be plated corresponds to the thickness of the soft magnetic layer 23. Therefore, it is possible to produce the soft magnetic layer 23 with a desired thickness by adjusting a plating time in accordance with the preferable thickness of the soft magnetic layer 23.

At this time, the non-magnetic layer 4 is used as an electrode for applying a voltage to each protruding structure 305. In that case, in FIG. 3C, the non-magnetic layer 4 itself is covered with the base material 302 that has not been removed and does not come into direct contact with the plating solution. Thus, the soft magnetic material made of permalloy does not adhere to the base material 302, and each protruding structure 305 and outer covering 304 are not connected magnetically to each other even in the later stage.

Even when another kind of soft magnetic material is used, covering can be performed similarly by using a plating solution in accordance with the composition of the soft magnetic material. In particular, in order to adjust the connection with the material forming the protruding structure 305, a material which contains the same elements while having a different composition and crystal structure may be used. For example, an L10 regularized alloy such as FePt, CoPt, FePd, or CoPd may be used as the protruding structure 305, and an L12 regularized alloy such as $FePd_3$, $Fe_3Pd$, $Fe_3Pt$, $FePt_3$, $CoPt_3$, or $Co_3Pt$ or an alloy that is not regularized may be used for the soft magnetic material. In general, those L12 regularized alloys or the alloy that is not regularized each have magnetic anisotropic energy density smaller than that of the L10 regularized alloy, and contain elements equivalent to those of the protruding structure 305, so the connection on the laminated surface can be performed satisfactorily. Those materials also can be laminated on the protruding structure 305 through electroplating by adjusting components of the plating solution.

Similarly, the protruding structure 305 made of the first metal X can be covered with the outer covering 304 made of the second metal Y by the second production method. However, in this case, it is also possible to use electroless plating method so as to have a metal having a catalyst effect as the main component of the metal X.

For example, the case of forming the hard magnetic layer 24 so as to mainly contain an L10 regularized alloy of FePt will be described. In this case, in the above-mentioned process (3), the protruding structure 305 which is convex in an upward direction and made of Pt is formed. Next, in order to allow Fe to be mainly contained as the metal Y, plating is performed with a plating solution containing iron chloride, iron sulfate and sulfamic acid, and the outer covering 304 made of the metal Y is laminated on the protruding structure 305. In the plating bath, Fe ions are unstable, and are likely to form a precipitate. Therefore, in order to stabilize the Fe ions, a complexing agent may also be added. As the complexing agent, any acid is selected appropriately from tartaric acid, citric acid, succinic acid, malonic acid, malic acid, gluconic acid, and a salt thereof. In particular, it is preferable to use tartaric acid or a salt thereof and/or citric acid or a salt thereof, and sodium tartrate and/or ammonium tartrate. By complexing metal ions, the pH concentration of the bath can also be increased, and the generation of hydrogen can be suppressed which otherwise become an obstacle during covering.

Figure 3F:
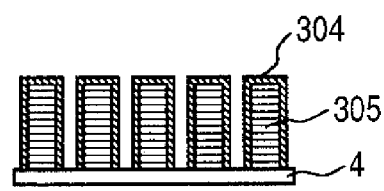

In the case of using electroless plating method for covering, it is not necessary to supply the protruding structure 305 with a current, so the conductivity of the non-magnetic layer 4 is not required. In particular, in the case of producing the protruding structure 305 by filling the porous member 300 with a material for forming the protruding structure 305 through a dry process, the non-magnetic layer 4 can be composed of an oxide such as MgO. In this case, in the porous base material removal process 73, the entire base material 302 can be completely removed so as to expose the non-magnetic layer 4 as illustrated in FIG. 3D. By subjecting the structure illustrated in FIG. 3D to electroless plating, the structure covered as illustrated in FIG. 3F is obtained. Such a process has an advantage in terms of production because it becomes easy to remove the base material in the porous base material removal process 73.

Alternatively, a Pt component can also be contained as the metal Y. In this case, hexachloroplatinate (IV) may be contained as a Pt component in the plating solution. An L10 regularized alloy is formed in a plating solution which contains Fe and Pt with a stoichiometric mixture ratio of close to 1:1, so Fe component needs to be contained in the metal Y in a larger ratio than a composition ratio in accordance with Pt forming the protruding structure 305, so as to form the soft magnetic layer 23 mainly containing Fe outside of the protruding structure in the later stage.

Even when the hard magnetic layer 24 mainly contains another type of L10 regularized alloy, Pt or Pd is used to form the protruding structure 305 in accordance with the main component of the hard magnetic layer 24. After that, the outer covering 304 made of the metal Y containing at least one of Fe, Co, and Ni may be formed by plating.

The thickness of the outer covering 304 to be plated can be set to be equal to the desired thickness of the soft magnetic layer 23. According to the second production method, the hard magnetic layer 24 is produced by L10-ordering of the first metal X constituting the protruding structure 305 and the second metal Y constituting the outer covering 304 in the heat treatment process in the later stage. In the heat treatment process, elements of the first metal X and the second metal Y are dispersed as descried later, the L10-ordering proceeds from the boundary between the first metal X and the second metal Y, and a portion with high magnetic anisotropic energy spreads outside of the diameter of the protruding structure 305 with respect to the boundary between the first metal X and the second metal Y. Therefore, it is desirable to set the diameter of the holes 301 of the porous member 300 to be small as described above, with respect to the desired diameter of the hard magnetic layer 24. In this case, the thickness of the outer covering 304 is preferably set to be larger than the desired thickness of the soft magnetic layer 23, considering the movement of the portion with magnetic anisotropic energy to the outer circumference. This increase may be set to be about 1 nm to 5 nm, corresponding to the decrease in the diameter of the holes 301 of the porous member 300.

(5) Heat Treatment Process

The second production method includes the heat treatment (regularization) process 75 after covering the protruding structure 305 made of the first metal X with the second metal Y.

Figure 3G:
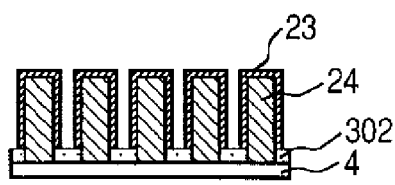
Figure 3H:
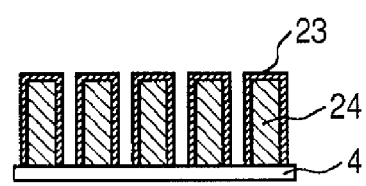

The structures illustrated in FIGS. 3G and 3H are obtained by heat-treating the structures which is obtained by covering the convex structures illustrated in FIGS. 3E and 3F with the outer covering 304 made of the metal Y.

Due to the heat treatment, the respective atoms are thermally diffused from the interface between Pt or Pd forming the protruding structure 305 and the metal Y (Fe, Co, Ni, and an alloy thereof) covering the surface thereof to start alloying, whereby the L10 regularized alloy structure is formed within the diameter. On the other hand, the metal Y remains in the outer circumferential portion of the outer covering, and the soft magnetic characteristics are kept. As a result, mainly in the protruding structure 305, the hard magnetic layer 24 containing a large amount of an L10 regularized alloy with large magnetic anisotropic energy density, which is obtained by regularizing the first metal X and the second metal Y, is formed. In the outer covering 304 on the outer circumference, the soft magnetic layer 23 in which the second metal Y remains without being regularized is formed.

As an example, the case will be described where the protruding structure 305 contains Pt as a main component, the outer covering 304 contains Fe as a main component, and the hard magnetic layer 24 contains an L10 regularized alloy of FePt as a main component as described above.

It is reported that, in the process of forming a FePt regularized alloy in the laminated structure of Fe and Pt. Fe atoms substitute on the Pt side in the initial stage of heat treatment to form a $FePt_3$ alloy, and after that, heat diffusion proceeds further, whereby a FePt regularized alloy is formed. In this process, similarly, Fe atoms substitute Pt of the protruding structure 305 to form a $FePt_3$ alloy, whereby a FePt regularized alloy is formed. As a result, a FePt regularized alloy is formed from the vicinity of the interface between the protruding structure 305 and the outer covering 304, and the L10-ordering develops due to heat diffusion, whereby a regularized alloying continues in such a manner that the Fe atoms substitute on the Pt atom side. Therefore, in the initial stage, the magnetic anisotropic energy density in the vicinity of the interface between the protruding structure 305 and the outer covering 304 increases. The L10-ordering proceeds due to the diffusion with the passage of time, and a region with high magnetic anisotropic energy density spreads, whereby the magnetic anisotropic energy density of the entire protruding structure 305 increases. Simultaneously, the magnetic anisotropic energy density in the vicinity of the interface increases on the outer covering 304 side, however, the increase in the magnetic anisotropic energy density is small because an amount of Pt on the outer circumferential side is small. In the case of setting the diameter of the protruding structure 305 to be smaller than that of the desired diameter of the hard magnetic film 24, a shift amount is absorbed in the distribution of the magnetic anisotropic energy density. Therefore, an average value of the magnetic anisotropic energy density becomes high in a substantially desired diameter of the hard magnetic film 24, and an average value of the magnetic anisotropic energy density becomes low in the soft magnetic film 23 constituting the outer circumference of the hard magnetic film 24.

On the other hand, the average saturation magnetization of the protruding structure 305 is small since the amount of non-magnetic Pt components is originally larger than that of magnetic Fe components. The saturation magnetization of the outer covering 304 is large since the amount of magnetic Fe components is larger than that of non-magnetic Pt components on average. The Fe atoms substitute on the Pt atom side due to regularization, whereby the average saturation magnetization of the protruding structure 305 increases and the average saturation magnetization of the outer covering 304 decreases. Since the initial ratio between Fe and Pt of the protruding structure 305 is largely different from that of the outer covering 304, the average saturation magnetization in the vicinity of the protruding structure 305 becomes larger than that of the outer covering 304.

Consequently, the hard magnetic layer 24 with relatively high average magnetic anisotropic energy density and relatively small average saturation magnetization is produced with the protruding structure 305 being the center, and the soft magnetic layer 23 with relatively low average magnetic anisotropic energy density and relatively low average saturation magnetization is produced from the outer covering 304.

This results in the following.

A ratio k of the average magnetic anisotropic energy density $Ku2$ of the soft magnetic layer 23 to the average magnetic anisotropic energy density $Ku1$ of the hard magnetic layer 24 becomes smaller than a ratio $\mu$ of the average saturation magnetization $Ms2$ of the soft magnetic layer 23 to the average saturation magnetization $Ms1$ of the hard magnetic layer 24 becomes small. Then, a layer satisfying the conditions for forming the hard magnetic layer 24 and the soft magnetic layer 23 is produced.

It is preferable that the heat treatment is performed under a reducing atmosphere, in particular, under vacuum or a hydrogen atmosphere. Particularly, by performing the heat treatment under a hydrogen atmosphere, an oxide and a hydroxide contained in metal can be removed, and heat diffusion is promoted. Further, the reducing effect is enhanced by irradiation of hydrogen plasma before the heat treatment or simultaneously therewith. In the case where the stoichiometric mixture ratio of Fe and Pt is set to be in the vicinity of 1:1 in advance, it is preferable to set the heat treatment temperature to about 600° C., but for the application of the magnetic recording medium, it is more preferable to set the temperature to 500° C. or less, and further preferably to 450° C. or less.

Further, rapid thermal annealing (RTA) with a high rate of temperature increase may also be preferably used as the heat treatment method.

Further, by adjusting a heat treatment time, the diffusion and regularization are adjusted, and the ratio k and the ratio μ of the average saturation magnetization Ms2 of the soft magnetic layer 23 to the average saturation magnetization Ms1 of the hard magnetic layer 24 can be adjusted simultaneously.

In this case, the ratio k is the ratio of the average magnetic anisotropic energy density Ku2 of the soft magnetic layer 23 to the average magnetic anisotropic energy density Ku1 of the hard magnetic layer 24.

In the case of using the first production method, the protruding structure 305 is formed of a hard magnetic material, and the outer covering 304 is formed of a soft magnetic material from the beginning. Therefore, a structure satisfying the above-mentioned conditions is produced with the hard magnetic layer 24 being formed of the protruding structure 305 as it is and the soft magnetic layer 23 being the outer covering 304 as it is.

(6) Burying Process with Respect to Non-Magnetic Substance and Magnetic Recording Film Surface Shaping Process.

Next, according to both the first and second production methods, burying processes 66, 76 of burying the non-magnetic material 21 and magnetic recording film surface shaping processes 67, 77 of completing a magnetic recording film 5 by polishing the surface are performed. As the non-magnetic material 21 to be buried, any material may be used as long as material is non-magnetic and does not degrade the soft magnetic layer 23 which the non-magnetic material 21 comes into contact with. For example, $SiO_2$ or $SiN_2$ may be buried by sputtering, CVD or vapor deposition. In order to flatten the surface of the magnetic recording film 5 after burying the non-magnetic material 21, the magnetic recording film surface shaping processes 67, 77 such as polishing or etching is preferably performed.

Figure 3I:
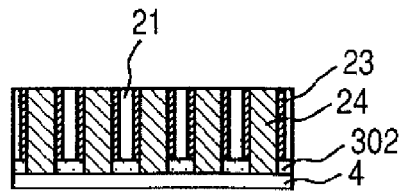
Figure 3J:
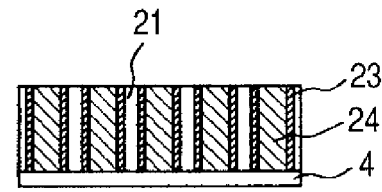
Figure 4:
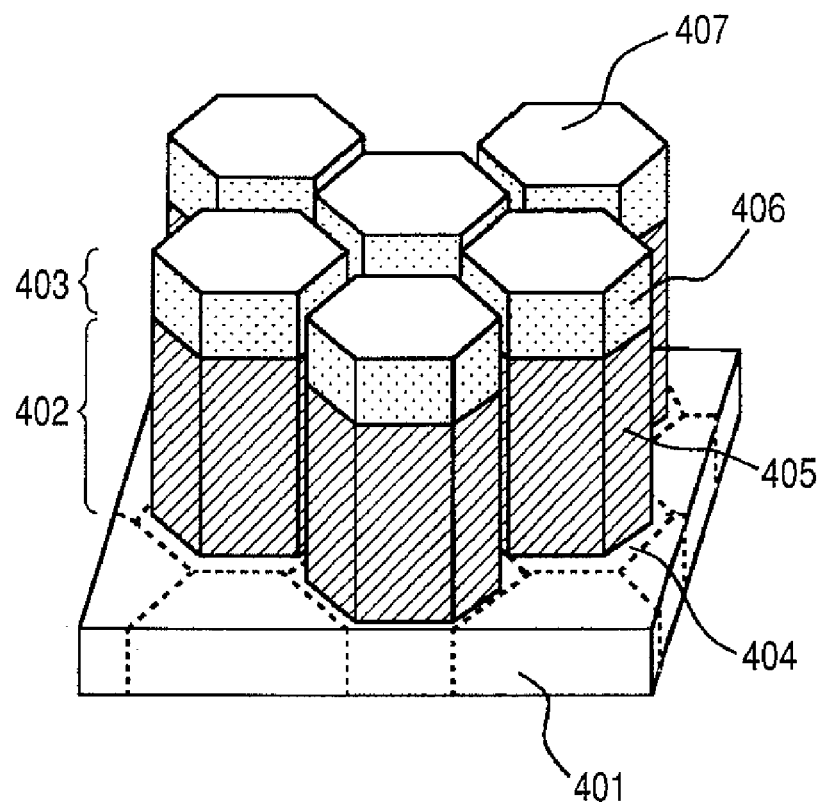
FIG. 4 is a view illustrating a configuration of a magnetic recording film of a perpendicular magnetic recording medium of a conventional example.

FIGS. 3I and 3J illustrate the magnetic recording films 5 after the magnetic recording film surface shaping processes 67, 67. The soft magnetic layer 23 formed of the outer covering 304 is formed, which surrounds the hard magnetic layer 24 formed through the L10-ordering of the protruding structure 305. The non-magnetic material 21 fills gaps between the soft magnetic layers 23 surrounding the hard magnetic layer 24, whereby the magnetic recording film 5 is configured.

In this production example, the surface of the magnetic recording film 5 is polished and etched so as to expose the hard magnetic layer 24 and the soft magnetic layer 23. At this time, the thickness of the magnetic recording film 5 can also be adjusted to a desired thickness.

Figure 9A:
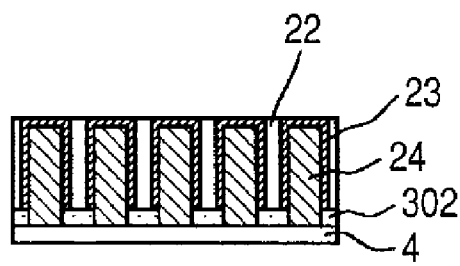
FIGS. 9A and 9B are views illustrating a method of forming a magnetic recording medium according to the present invention.
Figure 9B:
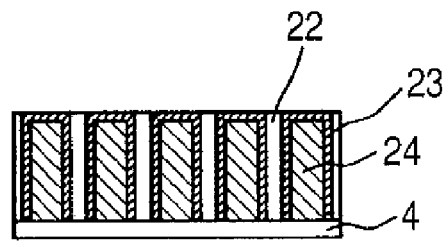

In particular, as illustrated in FIGS. 9A and 9B, a structure having the soft magnetic layer 23 can also be formed in an upper layer of the hard magnetic layer 24.

FIGS. 9A and 9B each illustrate a third embodiment of the present invention, and reference numerals therein are the same as those in FIGS. 2 and 3. In this configuration, a part of the soft magnetic layer 23 generated by being laminated in an upper layer of the protruding structure in the covering process (4) is left without being removed in the magnetic recording film surface shaping processes 67, 77. On the surface of the magnetic recording film 5, the soft magnetic layer 23 is exposed.

Due to the relatively large magnetic exchange coupling caused by the small thickness of the soft magnetic layer 23 obtained as described above, the magnetization in the same direction as that of the magnetization of the hard magnetic layer 24 is induced in the portion of the soft magnetic layer 23 on the surface of the magnetic recording film 5. Therefore, the magnetization of the surface of the magnetic recording film 5 to be read during reproduction is not different from that in the case of FIGS. 3I and 3J where the hard magnetic layer 24 is exposed to the surface of the magnetic recording film 5.

In this configuration, compared with the case where the soft magnetic layer 23 is provided only on the side surface of the hard magnetic layer 24, the recording sensitivity is enhanced by setting the ratio in volume between the soft magnetic layer 23 and the hard magnetic layer 24 even with the same thickness of the soft magnetic layer 23. On the other hand, compared with the conventional example, the recording sensitivity can be enhanced due to the volume of the soft magnetic layer 23 on the side surface, without setting the thickness of the magnetic layer to be extremely large. The above-mentioned configuration also has an advantage in terms of production because the thickness to be polished in the magnetic recording film surface shaping processes 67, 77 is small.

In order to obtain a recording medium finally, a protective layer 6 and a lubricating layer 7 may be formed on the magnetic recording film 5 produced as described above, through an ordinary film formation process.

Regarding the production of the magnetic recording film 5 according to the second embodiment of the present invention, the same processes as those according to the second production method of the first embodiment can be used. The main difference therebetween lies between the first metal X and the second metal Y in terms of composition.

The protruding structure 305 is produced such that the metal material X' filling the porous member 300 contains magnetic Fe, Co in a larger element ratio, compared with Pt, Pd. The protruding structure 305 is covered with metal Y', which contains Pt, Pd as main components, as the outer covering 304.

In the heat treatment process 75, Fe of the protruding structure 305 diffuse to the outer covering 304 portion, whereby the L10-ordering occurs, and the magnetic anisotropic energy density increases mainly in the outer covering 304 portion. On the other hand, in the protruding structure 305 portion, magnetic elements such as Fe also are left in a relatively large amount even after the heat treatment process 75, so the average saturation magnetization becomes larger than that in the outer covering 304 portion.

Because of this, the hard magnetic layer 24 can be formed so as to surround the soft magnetic layer 23, with k being smaller than the ratio μ of the average saturation magnetization Ms2 of the soft magnetic layer of the inner diameter to the average saturation magnetization Ms1 of the hard magnetic layer 24 of the outer diameter.

Herein, k is the ratio of the average magnetic anisotropic energy density Ku2 of the soft magnetic layer 23 of the inner diameter to the average magnetic anisotropic energy density Ku1 of the hard magnetic layer 24 of the outer diameter.

The production processes are the same as those of the second production method according to the first embodiment illustrated in FIG. 3, and the respective processes have many similarities, so different portions will be described in particular.

(1') Porous Member Production Process

The porous member is produced by the method described in Japanese Patent Application Laid-Open No. 2002-175621 in the same way as in the second production method according to the first embodiment. When the volume of the soft magnetic layer 23 constituting the inside is set to be smaller than that of the hard magnetic layer 24 constituting the outer portion in the second embodiment, the entire performance balance of the magnetic recording film 5 is rendered preferable in most cases.

On the other hand, in the L10-ordering in the heat treatment process described later, the L10-ordering starts from the vicinity of the boundary between the first metal X' forming the protruding structure 305 in the center and the metal Y' forming the peripheral outer covering 304. The region with high magnetic anisotropic energy density is formed with the boundary portion being the center, so the radius of the soft magnetic layer in the vicinity of the center to be produced may be slightly smaller than the radius of the protruding structure 305. In view of this, it is desired to set the radius of the protruding structure 305 to be slightly larger than that of the desired radius of the soft magnetic layer 23 in the second embodiment.

As a result, the diameter of the protruding structure 305 becomes substantially the same as that in the first embodiment, and the porous member 300 with a hole diameter of about 1 nm or more to 10 nm or less is produced. As described above, those holes can be produced using the method described in Japanese Patent Application Laid-Open No. 2002-175621.

(2') First Metal X' Filling Process

A plurality of holes in the porous member 300 are filled with the first metal X' for forming the protruding structure 305. The difference from the second production method according to the first embodiment lies in the composition of the first metal X'.

It is preferable to use Fe or Co as the first metal X' to be filled in terms of characteristics of soft magnetism. In order to prevent the protruding structure 305 from being degraded with an acid in the base material removal process in the later stage, it is preferable to allow the metal to contain a relatively small amount of Pt and Pd, while containing the metal X' as main components.

The above-mentioned plating is used for filling, and the desired metal X' can be produced as the protruding structure 305 by allowing a plating solution to contain a large amount of Fe or Co ions. Further, burying by a dry process using arc plasma gas is also an effective method.

(3') Base Material Removal Process

A part or entirety of the base material 302 is removed by being soaked in hydrogen fluorine.

(4') Covering Process

The protruding structure 305 made of the first metal X' is covered with the second metal Y'. According to the production method of the second embodiment, the second metal Y' is assumed to contain Pt and Pd as main components.

Covering can be performed using plating in the same way as in the second production method according to the first embodiment. Particularly, in the second embodiment, the second metal Y' to be laminated contains precious metal such as Pt and Pd as main components, so covering by electroless plating is effective. In this case, the filling process is performed through a dry process with the non-magnetic layer 4 being an oxide, and the base material may be removed so as to expose the non-magnetic layer 4.

Particularly, in the case where the second metal Y' is Pt and Pd, these elements themselves do not exhibit strong magnetic characteristics. Therefore, it is also possible to use them as the non-magnetic material 21 separating the magnetic region 22. In this case, each protruding structure 305 may be buried entirely, instead of covering the protruding structure 305 with the second metal Y' as the outer covering 304. In this way, the burying process with respect to the non-magnetic substance can be omitted.

In this case, the outer diameter of the hard magnetic layer 24 corresponds to the diffusion distance at which Fe diffuse to be L10 regularized in the heat treatment (regularization) process in the later stage. Therefore, in order to ensure the magnetic separation in the magnetic region 22, it is necessary to adjust a range that is to be regularized in the heat treatment process.

(5') Heat Treatment Process

Due to the heat treatment, respective atoms diffuse thermally from the interface between Fe, Co of the protruding structure 305 and the metal Y' covering the surface of the protruding structure 304, the metal Y' containing Pt or Pd as a main component, to start alloying, whereby an L10 regularized alloy structure is formed. The L10-ordering starts from the vicinity of the interface between the protruding structure 305 and Pt or Pd on the periphery thereof. Therefore, by adjusting the regularization time, regularization in the vicinity of the center of the protruding structure 305 does not proceed, and components of elements with magnetism such as Fe and Co are present in a large amount, so the average saturation magnetization can be kept large. At this time, the outside of the vicinity of the interface between the protruding structure 305 and Pt or Pd on the periphery is L10 regularized, and has characteristics of a magnetic film because magnetic elements such as Fe and Co diffuse therein. On the outer side thereof, Pt or Pd mainly is present, which are non-magnetic material.

Therefore, the soft magnetic layer 23 in the center is likely to be formed so as to have a diameter slightly smaller than that of the protruding structure 305, and the hard magnetic layer 24 is likely to be formed so as to have a thickness slightly larger than that of the outer covering 304. In view of this, the diameter of the protruding structure 305 can be set to be larger than the desired diameter of the soft magnetic layer 23, and the thickness of the outer covering 304 for covering the protruding structure 305 can be set to be smaller than that of the hard magnetic layer 24.

In general, when the volume of the hard magnetic layer 24 is smaller than that of the soft magnetic layer 23, the performance such as the "thermal fluctuation" durability, recording sensitivity, and recording density of the magnetic recording film 5 is likely to be balanced. Therefore, even in the case of considering the above-mentioned effect, the diameter of the protruding structure 305 to be formed, and the thickness of the outer covering 304 to be formed are not deviated largely from the production conditions in the first example, and fall within a producible range.

By adjusting the time of the heat treatment process, the protruding structure 305 has relatively small magnetic anisotropic energy density and relatively large saturation magnetization in the vicinity of the center thereof.

Then, it is structured such that the vicinity of the interface between the protruding structure 305 and Pt or Pd on the periphery has relatively large magnetic anisotropic energy density and relatively small saturation magnetization. Further, by adjusting the time, the distance of the diffusion of magnetic elements such as Fe and Co is set to be a half of the distance between the adjacent protruding structures 305, whereby the magnetic region 22 can be separated.

In the manner as described above, the magnetic recording film 5 of the second embodiment can be formed, in which the soft magnetic layer 23 is formed in the vicinity of the center of the protruding structure 305, the hard magnetic layer 24 is formed on the outer circumference thereof, and Pt or Pd on the further outer circumference are used as the non-magnetic material 21 separating the magnetic region 22.

In order to further ensure the effect of separating the magnetic region 22, a process similar to that of the production method of the first example for forming the outer covering 304 of Pt or Pd as a coating film, and burying the entire structure after the heat treatment in the non-magnetic material such as $SiO_2$ and $SiN_2$ by sputtering may be provided. Further, at this time, in the magnetic recording film surface shaping process, a portion of the hard magnetic layer 24 produced in the soft magnetic layer 23 can also be exposed to the magnetic recording film surface, instead being removed.

Finally, the magnetic recording film 5 of the second embodiment is completed by performing the magnetic recording film surface shaping process, and after that, the protective layer 6 and the lubricating layer 7 are formed, to thereby obtain a recording medium of the second embodiment.

Hereinafter, the present invention will be described more specifically by illustrating examples.

EXAMPLE 1

As Example 1, an example of producing the above-mentioned first embodiment by the first production method will be described. In particular, the main point of the present invention lies in the configuration of the magnetic recording film. Therefore, description will be made mainly with respect to the production method of the magnetic recording film.

A soft magnetic underlying layer made of CoZrNb is produced to a thickness of 500 nm on a disk-shaped glass substrate plated with NiP, and a magnetic recording film is produced by the following method.

(1) Process of Forming a Plurality of Holes in a Film

On the substrate, (001) aligned MgO of 50 nm and (001) aligned Pt of 10 nm are formed by sputtering. Further, an AlSi structure of 20 nm formed from a sputtering target with an $Al_{56}Si_{44}$ composition is successively formed. The AlSi structure used herein is formed of a cylindrical aluminum portion and a Si base material surrounding the cylindrical aluminum portion. In order to remove the aluminum portion of the AlSi structure to form fine holes, the AlSi structure is soaked in 2.8 mol % of ammonia water at room temperature for 10 minutes. In this case, the average diameter of the holes is 6 nm, and the interval between the holes is 12 nm on average. The Si portion is oxidized when the AlSi structure is soaked in the ammonia water to become $SiO_2$. As a result, a porous layer is formed.

(2) Filling Process

The porous layer in which an underlying Pt surface is exposed in bottom portions of the holes are filled with a FePt alloy using plating method. A plating bath used herein is obtained as follows.

The plating bath contains 0.011 mol/L of hexachloroplatinate (IV), 0.022 mol/L of ammonium chloride, 0.02 mol/L of iron sulfate, 0.02 mol/L of ammonium tartrate, and 0.1 mol/L of sodium chloride. The bath temperature is set to be 50° C. and the pH thereof is adjusted to 8. As a surfactant, 0.0001 mol/L of sodium dodecyl sulfate can also be added. The holes are filled with a FePt alloy by plating using the above-mentioned plating bath. The FePt alloy composition to be plated can be selected depending upon the production conditions, particularly, the applied voltage, and 50 atomic % of FePt is produced.

(3) Heat Treatment Process

The structure produced in the above-mentioned process is heat-treated at 500° C., and after the heat treatment, a FePt thin portion is removed by polishing, whereby an upper portion of the columnar structure is exposed. Whether or not an L10 regularized alloy phase made of an alloy material filling the holes is formed can be determined based on whether or not a peak of x-ray diffraction involved in the L10-ordering structure is observed.

(4) Base Material Removal Process $SiO_2$ of the base material is removed by soaking the produced structure in a 20% tetramethylammonium hydroxide (TMAH) solution. When the composition of the structure is analyzed by energy dispersive X-ray spectroscopy (EDS), a Si peak is observed, and it can be confirmed that $SiO_2$ with a thickness of about 5 nm is left in the vicinity of the underlying portion by cross-section TEM.

(5) Soft Magnetic Layer Covering Process

The resultant structure is plated with a current density of 10 to 15 $mA/cm^2$ using a plating solution containing 300 g/l of $NiSiO_4.7H_2O$, 25 g/l of $NiCl_2.6H_2O$, 10 g/l of $FeSO_4.7H_2O$, 15 g/l of $H_3BO_3$, 0.5 g/l of saccharin sodium, and 0.2 g/l of sodium laurylsulfate, and FePt exposed in the above-mentioned process is covered with a permalloy film having a thickness of about 2 nm.

(6) Burying Process $SiO_2$ is buried by sputtering with respect to the resultant structure, and the surface thereof is polished to form a magnetic recording film. After that, a protective layer and a lubricating layer are produced to obtain a magnetic recording medium.

For comparison, a magnetic recording medium having a magnetic recording film is produced in which a soft magnetic layer is not provided by omitting the processes after the base material removal process (4).

Then, the recording medium is set at a spin stand, and a recording/reproduction test in which recording is performed using an SPT recording head and reproduction is performed using an MR reproduction head is conducted, whereby it can be confirmed that the recording sensitivity is enhanced. For example, a single tone signal corresponding to a pit length of 50 nm is recorded with varying recording applied magnetic field intensities with an SPT recording head having a track width of 0.15 μm, and the single tone signal is reproduced with an MR reproduction head simultaneously. Thus, the lower limit recording applied magnetic field at which a reproduced signal can be observed is set to be the minimum recording magnetic field. Simultaneously, a magnetic recording medium for reference produced excluding (5) Soft magnetic layer covering process is produced. Then, the same recording/reproduction test as in the above is conducted with respect to the medium. Consequently, it can be confirmed that the minimum recording magnetic field of the magnetic recording medium in this example is smaller than the minimum recording magnetic field of the magnetic recording medium for reference, and the recording sensitivity is enhanced.

EXAMPLE 2

As Example 2, an example of implementing the first embodiment by the second production method will be described. In particular, the main point of the present invention lies in the configuration of the magnetic recording film. Therefore, description will be made mainly with respect to the production method of the magnetic recording film.

A soft magnetic underlying layer made of CoZrNb is produced to a thickness of 500 nm on a disk-shaped glass substrate plated with NiP, and a magnetic recording film is produced by the following method.

(1) Process of Forming a Plurality of Holes in a Film

On a substrate, (001) aligned MgO of 50 nm and (001) aligned Pt of 10 nm are formed by sputtering. Further, an AlSi structure of 20 nm formed from a sputtering target with an $Al_{56}Si_{44}$ composition is successively produced. The AlSi structure used herein is formed of a cylindrical aluminum portion and a Si base material surrounding the cylindrical aluminum portion. In order to remove the aluminum portion of the AlSi structure to form fine holes, the AlSi structure is soaked in 2.8 mol % of ammonia water at room temperature for 10 minutes. Herein, the average diameter of the holes is 6 nm, and the interval between the holes is 12 nm on average. The Si portion is oxidized when the AlSi structure is soaked in the ammonia water to become $SiO_2$. Consequently, a porous layer is formed.

(2) Filling Process

The holes are filled with Pt using electroless plating. A Pt electroless plating solution is obtained as follows.

The plating solution is obtained by mixing 100 ml of Lectroless Pt 100 basic solution (produced by Electroplating Engineers of Japan Ltd.), 10 ml of 28% ammonia water, 2 mL of Lectroless Pt 100 reducing agent (produced by Electroplating Engineers of Japan Ltd.), and 88 mL of pure water, followed by adjustment. The holes are filled with Pt by soaking the porous layer in the plating solution at 60° C. for 10 minutes. As a result of the observation with an FE-SEM, the porous layer is filled with Pt having a diameter of about 5 nm and a height of about 20 nm.

(3) Base Material Removal Process $SiO_2$ of the base material is removed by soaking the produced structure in a 20% tetramethylammonium hydroxide (TMAH) solution. When the composition of the structure is analyzed by energy dispersive X-ray spectroscopy (EDS), a Si peak is observed, and it can be confirmed that $SiO_2$ with a thickness of about 5 nm is left in the vicinity of the underlying portion by cross-section TEM.

(4) Covering Process

Pt having a protruding structure is covered with Fe by plating. The protruding Pt serves as an electrode, and Fe is plated so as to cover Pt. As the Fe plating bath, in order to control the plating rate, a plating bath containing a complex structure obtained by adding ammonium tartrate to iron chloride is used, whereby Fe with a thickness of about 1 nm to 2 nm adheres to Pt.

(5) Heat Treatment Process

After the plating, heat treatment is conducted at 500° C. in a hydrogen atmosphere by an RTA method. After the heat treatment, a strong (001) diffraction peak of FePt alloyed by XRD is observed, and it is confirmed that FePt aligned in a c-axis is produced.

(6) Burying and Surface Shaping Process $SiO_2$ is buried by sputtering with respect to the resultant structure, and the surface thereof is polished to form a magnetic recording film. After that, a protective layer and a lubricating layer are produced to obtain a magnetic recording medium.

EXAMPLE 3

As Example 3, an example of implementing the second embodiment will be described. Since a large number of portions of this example overlap those of the Example 2, in particular, only different portions will be described.

In the same way as in Example 2, a soft magnetic underlying layer made of CoZrNb is produced to a thickness of 500 nm on a disk-shaped glass substrate plated with NiP, and (1) Process of forming a plurality of holes in a film in Example 2 is conducted, whereby a porous layer is formed.

Next, the porous layer is filled with the FePt alloy rich in Fe by electroplating using a Pt layer under the porous layer as an electrode.

The plating bath used herein is the same as that used in the FePt filling process in the first example. The plating bath contains 0.011 mol/L of hexachloroplatinate (IV), 0.022 mol/L of ammonium chloride, 0.02 mol/L of iron sulfate, 0.02 mol/L of ammonium tartrate, and 0.1 mol/L of sodium chloride. The bath temperature is set to 50° C. and the pH thereof is adjusted to 8. The applied voltage is set to a further minus side, whereby an Fe composition is increased. As a surfactant, 0.0001 mol/L of sodium dodecyl sulfate can also be added. By performing plating with the above-mentioned plating bath, the holes are filled with the FePt alloy.

After that, the same base material removal process as that in Example 2 is conducted to remove the base material.

Further, the resultant porous layer is covered with Pt by electroless plating. The Pt electroless plating solution is obtained as follows.

The plating solution is obtained by mixing 100 ml of Lectroless Pt 100 basic solution (produced by Electroplating Engineers of Japan Ltd.), 10 ml of 28% ammonia water, 2 mL of Lectroless Pt 100 reducing agent (produced by Electroplating Engineers of Japan Ltd.), and 88 mL of pure water, followed by adjustment. The porous layer is soaked in the plating solution at 60° C. for 10 minutes, whereby the porous layer is filled with Pt.

In this state, heat treatment is conducted for regularization. Finally, $SiO_2$ is buried by sputtering, and the surface is polished to obtain a magnetic recording film. After that, a protective layer and a lubricating layer are produced to obtain a magnetic recording medium.

The perpendicular magnetic medium according to the present invention is applicable to high-density magnetic recording apparatuses such as an HDD apparatus, and an information processing apparatus and an image recording apparatus including the above-mentioned high-density magnetic recording apparatuses.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2006-070000, filed Mar. 14, 2006 which is hereby incorporated by reference herein in its entirety.

What is claimed is:

1. A magnetic recording medium having a magnetic recording film, said magnetic recording film comprising at least one magnetic region dispersed in a non-magnetic region matrix, each said magnetic region comprising at least a core surrounded by a shell, wherein the core comprises one of a hard magnetic material or a soft magnetic material and the shell comprises the other said of said hard magnetic material or said soft magnetic material, wherein a cross-section of the core and shell is parallel to a surface of the magnetic recording film and wherein a diameter of the core and shell is uniform in the thickness direction of the magnetic recording film.

2. The magnetic recording medium of claim 1, wherein the magnetic recording film comprises a plurality of magnetic regions.

3. The magnetic recording medium of claim 1, wherein the core and the shell are substantially cylindrical.

4. The magnetic recording medium of claim 3, wherein the diameter of a cross-section of the cylinder is 10 nanometers or less.

5. The magnetic recording medium according to claim 1, wherein the magnetic region is provided such that the shell comprises the hard magnetic material and the core comprises the soft magnetic material.

6. The magnetic recording medium according to claim 1, wherein the magnetic region is provided such that the shell comprises the soft magnetic material and the core comprises the hard magnetic material.

7. The magnetic recording medium according to claim 1, wherein an average magnetic anisotropic energy density of the soft magnetic material is half or less as an average magnetic anisotropic energy density of the hard magnetic material.

8. The magnetic recording medium according to claim 1, wherein a ratio $k=Ku2/Ku1$ of an average magnetic anisotropic energy density $Ku2$ of the soft magnetic material to an average magnetic anisotropic energy density $Ku1$ of the hard magnetic material is smaller than a ratio $\mu=Ms2/Ms1$ of an average saturation magnetization $Ms2$ of the soft magnetic material to an average saturation magnetization $Ms1$ of the hard magnetic material.

9. The magnetic recording medium according to claim 6, wherein:
the magnetic region is provided such that the shell comprising the soft magnetic material covers the periphery of the core comprising the hard magnetic material;
a radius of a cross-section in a direction parallel to a film surface of a film of the core comprising the hard magnetic material is equal to or less than a critical radius Rh represented by the following formula (1):

$$Rh \frac{36\sqrt{AhKh}}{4\pi Msh^2} \quad (1)$$

where, in the core comprising the hard magnetic material, Rh represents a critical radius (cm), Ah represents an exchange stiffness constant (erg/cm), Kh represents a magnetic anisotropy constant (erg/cc), and Msh represents saturation magnetization (emu/cc); and
a thickness of a cross-section in a direction parallel to a film surface of a film of the shell comprising the soft magnetic material is twice or less of a critical radius Rs represented by the following formula (2):

$$Rs = \frac{C\sqrt{As}}{Mss} \quad (2)$$

where, in the shell comprising the soft magnetic material, Rs represents a critical radius (cm), C represents a coefficient depending upon a shape, which is 1.44, As represents an exchange stiffness constant (erg/cm), and Mss represents saturation magnetization (emu/cc).

10. The magnetic recording medium according to claim 5, wherein:
the magnetic region is provided such that the shell comprising a hard magnetic material covers the periphery of the core comprising a soft magnetic material;
a radius of a cross-section in a direction parallel to a film surface of a film of the core portion comprising the soft magnetic material is equal to or less than a critical radius Rs represented by the following formula (2):

$$Rs = \frac{C\sqrt{As}}{Mss} \quad (2)$$

where, in the core comprising the soft magnetic material, Rs represents a critical radius (cm), C represents a coefficient depending upon a shape, which is 1.44, As represents an exchange stiffness constant (erg/cm), and Mss represents saturation magnetization (emu/cc); and
a thickness of a cross-section in a direction parallel to a film surface of a film of the shell comprising the hard magnetic material is twice or less of a critical radius Rh represented by the following formula (1):

$$Rh \frac{36\sqrt{AhKh}}{4\pi Msh^2} \quad (1)$$

where, in the shell comprising the hard magnetic material, Rh represents a critical radius (cm), Ah represents an exchange stiffness constant (erg/cm), Kh represents a magnetic anisotropy constant (erg/cc), and Msh represents saturation magnetization (emu/cc).

11. The magnetic recording medium according to claim 1, wherein the hard magnetic material has a magnetic anisotropy easy axis in a direction perpendicular to the film surface of the magnetic recording medium.

12. The magnetic recording medium according to claim 8, wherein a difference of an average magnetic anisotropic energy density and an average saturation magnetization is caused by a difference in constituent elements constituting the hard magnetic material and the soft magnetic material.

13. The magnetic recording medium according to claim 8, wherein a difference of an average magnetic anisotropic energy density and an average saturation magnetization is caused by a difference of at least one of a composition ratio and a crystal structure of constituent elements constituting the hard magnetic material and the soft magnetic material.

14. The magnetic recording medium according to claim 8, wherein a difference of an average magnetic anisotropic energy density and an average saturation magnetization is caused by a combination of a difference in constituent elements constituting the hard magnetic material and the soft magnetic material and a difference in at least one of a composition ratio and a crystal structure of the constituent elements.

15. The magnetic recording medium according to claim 1, wherein the hard magnetic material contains any of FePt, FePd, CoPt, and CoPd having an L10 regularized structure.

16. The magnetic recording medium according to claim 1, wherein the soft magnetic material contains any of Fe, Ni, and Co.

* * * * *